US011071122B2

(12) United States Patent
Calabrese et al.

(10) Patent No.: US 11,071,122 B2
(45) Date of Patent: Jul. 20, 2021

(54) METHOD AND UNIT FOR RADIO RESOURCE MANAGEMENT USING REINFORCEMENT LEARNING

(71) Applicant: HUAWEI TECHNOLOGIES CO., LTD., Shenzhen (CN)

(72) Inventors: Francesco Davide Calabrese, Kista (SE); Pablo Soldati, Kista (SE); Gunnar Peters, Kista (SE); Euhanna Ghadimi, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/382,227

(22) Filed: Apr. 12, 2019

(65) Prior Publication Data

US 2019/0239238 A1    Aug. 1, 2019

Related U.S. Application Data

(63) Continuation of application No. PCT/EP2016/074617, filed on Oct. 13, 2016.

(51) Int. Cl.
*H04W 72/08* (2009.01)
*H04W 24/08* (2009.01)
*H04W 72/04* (2009.01)
*H04W 28/16* (2009.01)

(52) U.S. Cl.
CPC ......... *H04W 72/085* (2013.01); *H04W 24/08* (2013.01); *H04W 28/16* (2013.01); *H04W 72/04* (2013.01)

(58) Field of Classification Search
CPC ........... H04W 72/085; H04W 72/1242; H04W 72/1236; H04W 72/04; H04W 24/08; H04W 28/16; H04W 47/626

USPC ......................................................... 370/329
See application file for complete search history.

(56) References Cited

U.S. PATENT DOCUMENTS

| 9,220,028 | B2* | 12/2015 | Suzuki | H04W 24/10 |
| 9,497,756 | B2* | 11/2016 | Dinan | H04L 5/0092 |
| 2008/0032677 | A1* | 2/2008 | Catovic | H04W 72/085 |
| | | | | 455/414.1 |

(Continued)

FOREIGN PATENT DOCUMENTS

| CN | 103548375 A | 1/2014 |
| CN | 105245395 A | 1/2016 |

(Continued)

OTHER PUBLICATIONS https://journals.plos.org/plosone/article?id=10.1371/journal.pone.0095693, Apr. 2014.*

(Continued)

*Primary Examiner* — Chi Ho A Lee
(74) *Attorney, Agent, or Firm* — Kilpatrick Townsend & Stockton LLP

(57) ABSTRACT

Agent node and method therein, for configuring a radio resource parameter of a radio cell of a communication system. The agent node is configured to obtain a control policy; determine a feature representing a state of at least a part of the communication system, at a first time period; determine a control action to be performed for control in the radio cell at the first time period, out of a set of available control actions associated with the radio cell, based on the obtained control policy and the determined at least one feature; and configure an of the radio cell based on the determined control action.

16 Claims, 8 Drawing Sheets

(56) References Cited

U.S. PATENT DOCUMENTS

| | | | |
|---|---|---|---|
| 2009/0285196 A1* | 11/2009 | Lee | H04L 47/626 |
| | | | 370/345 |
| 2013/0198755 A1* | 8/2013 | Kim | G06F 9/505 |
| | | | 718/104 |
| 2014/0047064 A1 | 2/2014 | Maturana et al. | |
| 2015/0289144 A1* | 10/2015 | Yi | H04W 72/042 |
| | | | 370/252 |
| 2016/0165465 A1 | 6/2016 | Park et al. | |
| 2016/0330676 A1* | 11/2016 | Thangarasa | H04W 76/14 |
| 2017/0085326 A1* | 3/2017 | Li | H04J 11/0023 |
| 2017/0364931 A1* | 12/2017 | Khavronin | G06Q 30/0204 |

FOREIGN PATENT DOCUMENTS

| | | | |
|---|---|---|---|
| EP | 3154238 | * | 4/2017 |
| EP | 3154238 A1 | | 4/2017 |
| WO | 2008016885 A2 | | 2/2008 |
| WO | 2015154366 A1 | | 10/2015 |

* cited by examiner

METHOD AND UNIT FOR RADIO RESOURCE MANAGEMENT USING REINFORCEMENT LEARNING

CROSS-REFERENCE TO RELATED APPLICATIONS

This application is a continuation of International Application No. PCT/EP2016/074617 filed on Oct. 13, 2016, the disclosure of which is hereby incorporated by reference in its entirety.

TECHNICAL FIELD

Implementations described herein generally relate to a network access unit and a method in a network access unit. In particular is herein described a mechanism for configuring a radio resource parameter of a radio cell of a communication system.

BACKGROUND

Radio Resource Management (RRM) in state of the art radio access networks, such as the 3$^{rd}$ Generation Partnership Project (3GPP) Long Term Evolution (LTE) system, comprises several problems that include power control, radio resource scheduling, link adaptation, load balancing, radio antenna tilting, cell range expansion, user association to radio cells, etc. Each RRM problem may require of either controlling a certain radio resource parameter (e.g., downlink transmission power of one or more eNodeBs, uplink transmit power of one or more user devices, electrical tilt of one or more eNodeBs, etc.), or controlling the parameter of a given control algorithms (e.g., a threshold value for performing cell handover, for selecting one or more radio frequency carriers to be assigned to a user device, etc.) or allocating a part of the shared radio resources (e.g. a time-frequency resource block) to user devices. Radio environmental measurements reported by the user devices as well as radio measurements performed by the radio access network nodes provide the basic information required by RRM algorithm to control one or more network operations. Radio environmental measurements include, for instance, Reference Signal Received Power (RSRP), Signal to Noise Ratio (SNR), interference, Channel Quality Indicator (CQI), Channel State Information (CSI), etc.

Different RRM problems are traditionally tackled with a dedicated algorithm that optimises the network operation for one specific RRM task, but the same algorithm cannot typically be reused for other RRM tasks. Additionally, within the RRM architecture different RRM tasks affect one another or require interacting with each other. This introduces large signalling overhead, additional complexity, and possibly performance degradation when the RRM task cannot be fully completed within the associated critical time limit or when only partial information from other RRM tasks is made available.

There is room for improvement for a method of accessing a UE to a heterogeneous network.

SUMMARY

It is therefore an objective to obviate at least some of the above mentioned disadvantages and to improve the radio resource management of a communication system.

This and other objectives are achieved by the features of the appended independent claims. Further implementation forms are apparent from the dependent claims, the description and the figures.

According to a first aspect, an agent node for configuring a radio resource parameter of a radio cell of a communication system is provided. The agent node is configured to obtain a control policy. Further the agent node is configured to determine at least one feature representing a state of at least a part of the communication system, at a first time period. The agent node is also configured to determine a control action to be performed for configuring the radio resource parameter in the radio cell at the first time period, out of a set of available control actions associated with the radio cell, based on the obtained control policy and the determined at least one feature. Also the agent node is configured to configure the radio resource parameter of the radio cell based on the determined control action.

By autonomously learning different radio resource management strategies using measurements collected from an algorithmic interaction with the radio environment, an appropriate adjustment of any radio resource parameter may be made. Thus, radio resource management based on learning the network environmental performance is provided, which may adapt to changes in radio environment conditions without manual adjustment. Thereby radio resources may be better managed, leading to increased network performance.

According to a first possible implementation of the first aspect, the agent node may be further configured to determine a feature representing the state of the part of the communication system, at a second time period. Also, the agent node may be configured to determine a performance measurement, associated with the performance within the radio cell. Furthermore, the agent node may be configured to transmit a training data message to a trainer node, comprising one or more in the group of: the determined feature representing the state at the first time period, the determined control action performed at the first time period, the determined feature representing the state at the second time period, and the determined performance measurement. Further the obtained control policy is received from the trainer node.

According to a second possible implementation of the first aspect, or the first possible implementation thereof, the agent node may be further configured to select which at least one feature to utilise for representing the state of at least a part of the communication system. Also the agent node may be configured to select which performance measurement associated with the radio cell to utilise for representing the performance of the radio cell.

According to a third possible implementation of the first aspect, or any previously described implementation thereof, wherein a radio network node controlling the radio cell is not co-located with the agent node, the agent node may be further configured to transmit an instruction to the radio network node for configuring the radio resource parameter of the radio cell.

According to a fourth possible implementation of the first aspect, or any previously described implementation thereof, wherein the feature representing the state of at least a part of the communication system, is determined based on any of: a measurement related to received signal quality made by and received from a user device in the radio cell; a measurement related to received signal quality made by and received from a user device in another radio cell; a measurement related to received signal quality made by and received from a user device in another radio cell; a measurement related to downlink transmission power of the radio cell made by and obtained from the radio network node controlling the radio cell; a measurement related to a number of active user devices in the radio cell; a measurement related to types, or distribution, of traffic within the radio cell; a measurement related to location, or distribution, of user devices in the radio cell; a performance measurement, associated with the performance within the radio cell; a measurement related to resource utilisation in the radio cell; and/or a measurement related to electrical tilt associated with the radio cell.

According to a fifth possible implementation of the first aspect, or any previously described implementation thereof, the agent node may be further configured to compute a performance measurement associated with at least a part of the communication system, based on the determined performance measurement and at least one other network performance measurement received from another radio network node in the communication system. Also, the agent node may be configured to transmit the training data message to the trainer node comprising the computed performance measurement.

According to a sixth possible implementation of the first aspect, or any previously described implementation thereof, wherein the obtained control policy further comprises an exploration-to-exploitation control parameter, associated with a probability of applying the determined control policy, the agent node may be further configured to determine application of the obtained control policy, based on the obtained exploration-to-exploitation control parameter.

According to a seventh possible implementation of the first aspect, or any previously described implementation thereof, wherein a radio network node controlling the radio cell is another agent node, the training data message transmitted to the trainer node comprises a training data message received from the other agent node; the agent node may be further configured to forward the control policy to be utilised for configuring the radio resource parameter in the radio cell of the other agent node in the communication system, received from the trainer node, to the other agent node.

According to an eighth possible implementation of the first aspect, or any previously described implementation thereof, the agent node may be further configured to iterate the determination of the feature representing the state of at least a part of the communication system; the determination of the control action; the configuration of the radio resource parameter instruction; the determination of the performance measurement; the transmission of the training data message, or a plurality of training data messages, to the trainer node and the obtaining of the control policy.

According to a ninth possible implementation of the first aspect, or any previously described implementation thereof, the agent node may be further configured to adjust the set of available control actions associated with the radio cell, based on the determined at least one feature representing the state of the part of the communication system, or based on the obtained control policy.

According to a tenth possible implementation of the first aspect, or any previously described implementation thereof, wherein the obtained control policy may be represented by one or more of: an indication of a neural network architecture, a parameter describing the number of inputs to the first layer of the neural network, a set of parameters describing the number of layers of the neural network, a set of parameters describing the number of neurons in different layers of the neural network, a parameter indicating the type of non-linear activation function used at each layer (which may comprise an s-shaped function like the sigmoid or the hyperbolic tangent, or a rectified linear unit, or an exponential linear unit, etc.), a set of parameters describing the connections between units of consecutive or non consecutive layers in the neural network, a set of indicators to at least one neural network index, a set of neural network weights, a number of neural networks to be configured for radio resource parameter control, a voting policy to be configured for determining the control action when the control policy comprises multiple neural networks.

According to an eleventh possible implementation of the first aspect, or any previously described implementation thereof, wherein the obtained control policy further may comprise: an indicator configuring a combining method for the agent node to aggregate results produced by individual neural networks for determining the control action; an indicator of the activation function for neurons in at least one neural network; an indicator of a parameter representing an axis aligned data split function for the control policy when based on a decision forest; an indicator of at least two parameters representing a linear data split function for the control policy based on the decision forest; an indicator of a parameter representing a quadratic data split function for the control policy based on the decision forest; an indication one or more hyper-parameters characterising the decision forest in the group of: maximum or minimum depth of the decision forest; depth of the decision forest; maximum or minimum number of decision trees; number of decision trees in the decision forest; information gain criterion; at least one indication of the stopping criteria to determine the depth of the decision forest.

According to a twelfth possible implementation of the first aspect, or any previously described implementation thereof, the agent node may be further configured to determine the performance measurement associated with the radio cell, given the feature representing the state at the first time period t and the power control action $a_t$ taken at the first time period t.

According to a thirteenth possible implementation of the first aspect, or any previously described implementation thereof, the agent node may be further configured to determine the performance measurement, associated with the performance within the radio cell by computing a weighted sum of scalars $x_i \in X$, parameterised by a scalar coefficient $\alpha \in [0, \infty)$ and transformed by a function $h_i: X \to R$ (with domain I and range of real scalars), $$r_t(x) = \frac{1}{1-\alpha} \sum_{x_i \in X} w_i (h_i(x_i)^{1-\alpha} - 1) \; \alpha \in [0, \infty),$$

where $x_i$ represents a radio measurement or a performance indicator associated with the radio cell, X is the set of all radio measurements or performance indicators associated with the radio cell and used for the definition of the performance measurement, $w_i$ is a weight associated with $x_i$, and $x=[x_1, \ldots x_{|x|}]$ is a vector comprising all $x_i \in X$.

According to a fourteenth possible implementation of the first aspect, or any previously described implementation thereof, the radio resource parameter to be configured is one or more in the group of: a control parameter associated with downlink power control in one or more radio cells, such as downlink power control adjustment value for a downlink power budget, a downlink power control adjustment value associated with at least one portion of a radio frequency spectrum utilised by one or more radio cells; a control parameter associated with uplink power control in one or more user devices, such as an uplink power control adjustment value, a fractional pathloss adjustment value, an open-loop power control configuration value; a control parameter associated with allocation of shared radio resources of one or more radio cells to one or more user devices, such as time-frequency resource blocks; a control parameter associated to an electronic tilt of one or more antennae; a control parameter for performing hand over or cell (re-)selection for the user device, such a threshold value of a signal strength indicator, an offset value of the signal strength indicator, a threshold value associated with resource availability in the cell, a threshold value associated with an expected data rate from the radio cell, a threshold value associated with experienced data rate from the radio cell; a control parameter associated with allocation of radio resources for control channel signalling, such as the number of Orthogonal Frequency-Division Multiplexing symbols allocated to a Physical Downlink Control Channel, number or allocation of time-frequency resource groups for Physical Downlink Control Channel; a control parameter associated with allocation of resources for sounding reference signals associated to one or more user devices in one or more radio cells, such as periodicity and distribution of sounding signals over time and frequency; a control parameter associated with numerology or type of waveform utilised in at least one portion of frequency spectrum of one radio cell, such as the duration of a transmission time interval, number of Orthogonal Polarisation and Frequency Division Multiplexing symbols, length of cyclic prefix, and indication to enable/disable cyclic prefix, duration of a symbol in time and frequency domain; a control parameter algorithm related to a threshold value for performing hand over or selecting one or more radio frequency carrier to be assigned to the user device.

According to a second aspect, a method in an agent node according to the first aspect, or any possible implementations thereof, for configuring a radio resource parameter of a radio cell of a communication system, is provided. The method comprises obtaining a control policy. Further the method may comprise determining at least one feature representing a state of at least a part of the communication system, at a first time period. In addition, the method also may comprise determining a control action to be performed for configuring the radio resource parameter in the radio cell at a first time period, out of a set of available control actions associated with the radio cell, based on the obtained control policy. Also the method in addition comprises configuring the radio resource parameter of the radio cell based on the determined control action.

According to a first possible implementation of the second aspect, the method may further comprise determining a feature representing the state of the part of the communication system at a second time period. Also, the method may further comprise determining a performance measurement, associated with the performance within the radio cell. In addition, the method may also comprise transmitting a training data message to the trainer node, comprising one or more in the group of: the determined feature representing the state at the first time period, the determined control action performed at the first time period, the determined feature representing the state at the second time period, and the determined performance measurement. The method may also comprise receiving the obtained control policy from the trainer node.

According to a second possible implementation of the second aspect, or the first possible implementation thereof, the method further may comprise selecting which at least one feature to utilise for representing the state of at least a part of the communication system. Also, the method comprises selecting which performance measurement associated with the radio cell to utilise for representing the performance of the radio cell.

According to a third possible implementation of the second aspect, or the first possible implementation thereof, wherein the radio network node controlling the radio cell is not co-located with the agent node, the method further may comprise transmitting an instruction to the radio network node for configuring the radio resource parameter of the radio cell of the radio network node.

According to a fourth possible implementation of the second aspect, or any previously described implementation thereof, wherein the feature representing the state of at least a part of the communication system, is determined based on any of: a measurement related to received signal quality made by and received from a user device in the radio cell; a measurement related to received signal quality made by and received from a user device in another radio cell; a measurement related to downlink transmission power of the radio cell made by and obtained from the radio network node controlling the radio cell; a measurement related to a number of active user devices in the radio cell; a measurement related to types or distribution of traffic within the radio cell; a measurement related to location or distribution of user devices in the radio cell; a performance measurement, associated with the performance within the radio cell a measurement related to resource utilisation in the radio cell; or a measurement related to electrical tilt associated with the radio cell.

According to a fifth possible implementation of the second aspect, or any previously described implementation thereof, the method further may comprise computing a performance measurement associated with at least a part of the communication system, based on the determined performance measurement and a network performance measurement received from another radio network node in the communication system; and wherein the training data message transmitted to the trainer node comprises the computed performance measurement.

According to a sixth possible implementation of the second aspect, or any previously described implementation thereof, the method further may comprise obtaining an exploration-to-exploitation control parameter, associated with a probability of applying the control policy. The method further comprises determining application of the obtained control policy, based on the obtained exploration-to-exploitation control parameter.

According to a seventh possible implementation of the second aspect, or any previously described implementation thereof, wherein the radio network node controlling the radio cell of the configured radio resource parameter is another agent node, the training data message transmitted to the trainer node comprises a training data message received from the other agent node; and wherein the control policy to be utilised for radio resource parameter control in the radio cell of the other agent node in the communication system, obtained from the trainer node, is forwarded to the other agent node.

According to an eighth possible implementation of the second aspect, or any previously described implementation thereof, the method comprises iterating the determination of the feature representing the state of at least a part of the communication system; the determination of the control action; the configuration of the radio resource parameter; the determination of the performance measurement; the transmission of the training data message, or a plurality of training data messages, to the trainer node and the obtaining of the control policy.

According to a ninth possible implementation of the second aspect, or any previously described implementation thereof, the method may comprise adjusting the set of available control actions associated with the radio cell, based on the determined at least one feature representing the state of the part of the communication system, or based on the control policy received by the trainer node.

According to a tenth possible implementation of the second aspect, or any previously described implementation thereof, the method may comprise iterating the method according to the second aspect, or any previously described implementation thereof.

According to an eleventh possible implementation of the second aspect, or any previously described implementation thereof, the method may comprise adjusting the set of available control actions associated with the radio cell, based on the determined feature representing the state of the part of the communication system.

According to a twelfth possible implementation of the second aspect, or any previously described implementation thereof, the method may comprise representing the obtained control policy by one or more of: an indicator configuring a combining method for the agent node to aggregate results produced by individual neural networks for determining the control action; an indicator of the activation function for neurons in at least one neural network; an indicator of a parameter representing an axis aligned data split function for the control policy when based on a decision forest; an indicator of at least two parameters representing a linear data split function for the control policy based on the decision forest; an indicator of a parameter representing a quadratic data split function for the control policy based on the decision forest; an indication one or more hyper-parameters characterising the decision forest in the group of: maximum or minimum depth of the decision forest; depth of the decision forest; maximum or minimum number of decision trees; number of decision trees in the decision forest; information gain criterion; at least one indication of the stopping criteria to determine the depth of the decision forest.

According to a thirteenth possible implementation of the second aspect, or any previously described implementation thereof, wherein the obtained control policy further comprises: an indicator configuring a combining method for the agent node to aggregate results produced by individual neural networks for determining the control action; an indicator of the activation function for neurons in at least one neural network; an indicator of a parameter representing an axis aligned data split function for the control policy when based on a decision forest; an indicator of at least two parameters representing a linear data split function for the control policy based on the decision forest; an indicator of a parameter representing a quadratic data split function for the control policy based on the decision forest; an indication one or more hyper-parameters characterising the decision forest in the group of: maximum or minimum depth of the decision forest; depth of the decision forest; maximum or minimum number of decision trees; number of decision trees in the decision forest; information gain criterion; at least one indication of the stopping criteria to determine the depth of the decision forest.

According to a fourteenth possible implementation of the second aspect, or any previously described implementation thereof, further comprising determining the performance measurement associated with the radio cell, given the feature representing the state at the first time period t and the power control action $a_t$ taken at the first time period t.

According to a fifteenth possible implementation of the second aspect, or any previously described implementation thereof, further comprising determining the performance measurement, associated with the performance within the radio cell by computing a weighted sum of scalars $x_i \in X$, parameterised by a scalar coefficient $\alpha \in [0, \infty)$ and transformed by a function $h_i: X \to R$ (with domain land range of real scalars), $$r_t(x) = \frac{1}{1-\alpha} \sum_{x_i \in X} w_i (h_i(x_i)^{1-\alpha} - 1) \; \alpha \in [0, \infty),$$

where $x_i$ represents a radio measurement or a performance indicator associated with the radio cell, X is the set of all radio measurements or performance indicators associated with the radio cell and used for the definition of the performance measurement, $w_i$ is a weight associated with $x_i$, and $x=[x_1, \ldots x_{|x|}]$ is a vector comprising all $x_i \in X$.

According to a sixteenth possible implementation of the second aspect, or any previously described implementation thereof, wherein the radio resource parameter to be configured is one or more in the group of: a control parameter associated with downlink power control in one or more radio cells, such a downlink power control adjustment value for a downlink power budget, a downlink power control adjustment value associated with at least one portion of a radio frequency spectrum utilised by one or more radio cells; a control parameter associated to uplink power control in one or more user devices, such an uplink power control adjustment value, a fractional pathloss adjustment value, an open-loop power control configuration value; a control parameter associated with allocation of shared radio resources of one or more radio cells to one or more user devices, such as time-frequency resource blocks; a control parameter associated to an electronic tilt of one or more antennae; a control parameter for performing hand over or cell (re-)selection for the user device, such a threshold value of a signal strength indicator, an offset value of the signal strength indicator, a threshold value associated with resource availability in the cell, a threshold value associated with an expected data rate from the cell, a threshold value associated with experienced data rate from the cell; a control parameter associated with allocation of radio resources for control channel signalling, such as the number of Orthogonal Frequency-Division Multiplexing symbols allocated to a Physical Downlink Control Channel, number or allocation of time-frequency resource groups for Physical Downlink Control Channel; a control parameter associated with allocation of resources for sounding reference signals associated to one or more user devices in one or more radio cells, such as periodicity and distribution of sounding signals over time and frequency; a control parameter associated with numerology or type of waveform utilised in at least one portion of frequency spectrum of one radio cell, such as the duration of a transmission time interval, number of Orthogonal Polarisation and Frequency Division Multiplexing symbols, length of cyclic prefix, and indication to enable/disable cyclic prefix, duration of a symbol in time and frequency domain; a control parameter algorithm related to a threshold value for performing hand over or selecting one or more radio frequency carrier to be assigned to the user device.

According to a third aspect, a computer program is provided, with a program code for performing a method according to the second aspect, or any possible implementation thereof, when the computer program runs on a computer.

According to a fourth aspect, a trainer node is provided for determining a control policy to be utilised by an agent node for configuring a radio resource parameter of a radio cell of a communication system. The trainer node is configured to: receive a training data message, associated with the radio cell, from the agent node, wherein the training data message comprises one or more in the group of: a feature representing a state of at least a part of the communication system at a first time period, a power control action performed by the agent node in the radio cell at the first time period, a feature representing the state at the second time period, and a performance measurement. Furthermore, the trainer node is configured to store the received training data message in a database associated with the radio cell. Also, the trainer node is configured to determine a control policy for the radio cell, based on at least one training data message, stored in the database. Furthermore, the trainer node is configured to transmit the determined control policy to the agent node.

According to a first possible implementation of the fourth aspect, the determined control policy may be determined by one or more of: an indicator configuring a combining method for the agent node to aggregate results produced by individual neural networks for determining the control action; an indicator of the activation function for neurons in at least one neural network; an indicator of a parameter representing an axis aligned data split function for the control policy when based on a decision forest; an indicator of at least two parameters representing a linear data split function for the control policy based on the decision forest; an indicator of a parameter representing a quadratic data split function for the control policy based on the decision forest; an indication one or more hyper-parameters characterising the decision forest in the group of: maximum or minimum depth of the decision forest; depth of the decision forest; maximum or minimum number of decision trees; number of decision trees in the decision forest; information gain criterion; at least one indication of the stopping criteria to determine the depth of the decision forest.

According to a second possible implementation of the fourth aspect, or any previously described implementation thereof, the determined control policy further comprises: an indicator configuring a combining method for the agent node to aggregate results produced by individual neural networks for determining the control action; an indicator of the activation function for neurons in at least one neural network; an indicator of a parameter representing an axis aligned data split function for the control policy when based on a decision forest; an indicator of at least two parameters representing a linear data split function for the control policy based on the decision forest; an indicator of a parameter representing a quadratic data split function for the control policy based on the decision forest; an indication one or more hyper-parameters characterising the decision forest in the group of: maximum or minimum depth of the decision forest; depth of the decision forest; maximum or minimum number of decision trees; number of decision trees in the decision forest; information gain criterion; at least one indication of the stopping criteria to determine the depth of the decision forest.

According to a third possible implementation of the fourth aspect, or any previously described implementation thereof, the trainer node may be further configured to determine an exploration-to-exploitation control parameter, associated with a probability of applying the determined control policy; and wherein the determined exploration-to-exploitation control parameter is transmitted to the agent node together with the determined control policy.

According to a fourth possible implementation of the fourth aspect, or the first possible implementation thereof, the trainer node may be configured to determine the exploration-to-exploitation control parameter so that the probability of applying the determined control policy is increased over time.

According to a fifth possible implementation of the fourth aspect, or any previously described implementation thereof, the trainer node may be configured to compute a performance measurement associated with at least a part of the communication system, based on the performance measurement received in the training data message received from the agent node and another performance measurement received from another radio network node in the communication system.

According to a sixth possible implementation of the fourth aspect, or any previously described implementation thereof, the trainer node may be configured to select which at least one feature the agent node is to utilise for representing the state of at least a part of the communication system and provide the made selection to the agent node.

According to a seventh possible implementation of the fourth aspect, or any previously described implementation thereof, the trainer node may be configured to select which performance measurement associated with the radio cell, the agent node is to utilise for representing the performance of the radio cell and provide the made selection to the agent node.

According to a fifth aspect, a method in a trainer node is provided for determining a control policy to be utilised by an agent node for configuring a radio resource parameter of a radio cell of a communication system. The method comprises receiving a training data message, associated with the radio cell, from the agent node, wherein the training data message comprises one or more in the group of: a feature representing a state of at least a part of the communication system at a first time period, a control action performed by the agent node in the radio cell at the first time period, a feature representing the state at the second time period, and a performance measurement. The method also comprises storing the received training data message in a database, associated with the radio cell. In addition, the method comprises determining a control policy for the radio cell, based on at least one training data message, stored in the database. The method also comprises transmitting the determined control policy to the agent node.

According to a first possible implementation of the fifth aspect, the method may comprise determining an exploration-to-exploitation control parameter, associated with the control policy; and wherein the determined exploration-to-exploitation control parameter is transmitted to the agent node together with the determined control policy.

According to a second possible implementation of the fifth aspect, or the first possible implementation thereof, wherein the exploration-to-exploitation control parameter is determined to be reduced over time.

According to a third possible implementation of the fifth aspect, or any of the previously described implementation thereof, the method may also comprise computing a performance measurement associated with at least a part of the communication system, based on the performance measurement received in the training data message received from the agent node and another performance measurement received from another radio network node in the communication system.

According to a fourth possible implementation of the fifth aspect, or any of the previously described implementation thereof, the method may also comprise selecting which at least one feature the agent node is to utilise for representing the state of at least a part of the communication system wherein the radio cell is comprised and sending the made selection to the agent node.

According to a fifth possible implementation of the fifth aspect, or any of the previously described implementation thereof, the method may also comprise selecting which performance measurement associated with the radio cell the agent node is to utilise for representing the performance of the radio cell and sending the made selection to the agent node.

According to a sixth aspect, a computer program is provided, with a program code for performing a method according to the fifth aspect, or any possible implementation thereof, when the computer program runs on a computer.

Thanks to the provided agent node, trainer node and methods therein, radio resource management is simplified and to some extent automated. By applying machine learning such as e.g. Reinforcement Learning, adaptation of radio resource parameters may be made without involving manual adjustments, also when e.g. traffic patterns, radio traffic intensity, communication content, etc., are changing over time. Thereby spectral efficiency of the system is enhanced.

Other objects, advantages and novel features of the aspects of the invention will become apparent from the following detailed description.

BRIEF DESCRIPTION OF THE DRAWINGS

Various embodiments are described in more detail with reference to attached drawings, illustrating examples of embodiments of the invention in which.

DETAILED DESCRIPTION

Embodiments of the invention described herein are defined as a network access unit and a method in a network access unit, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
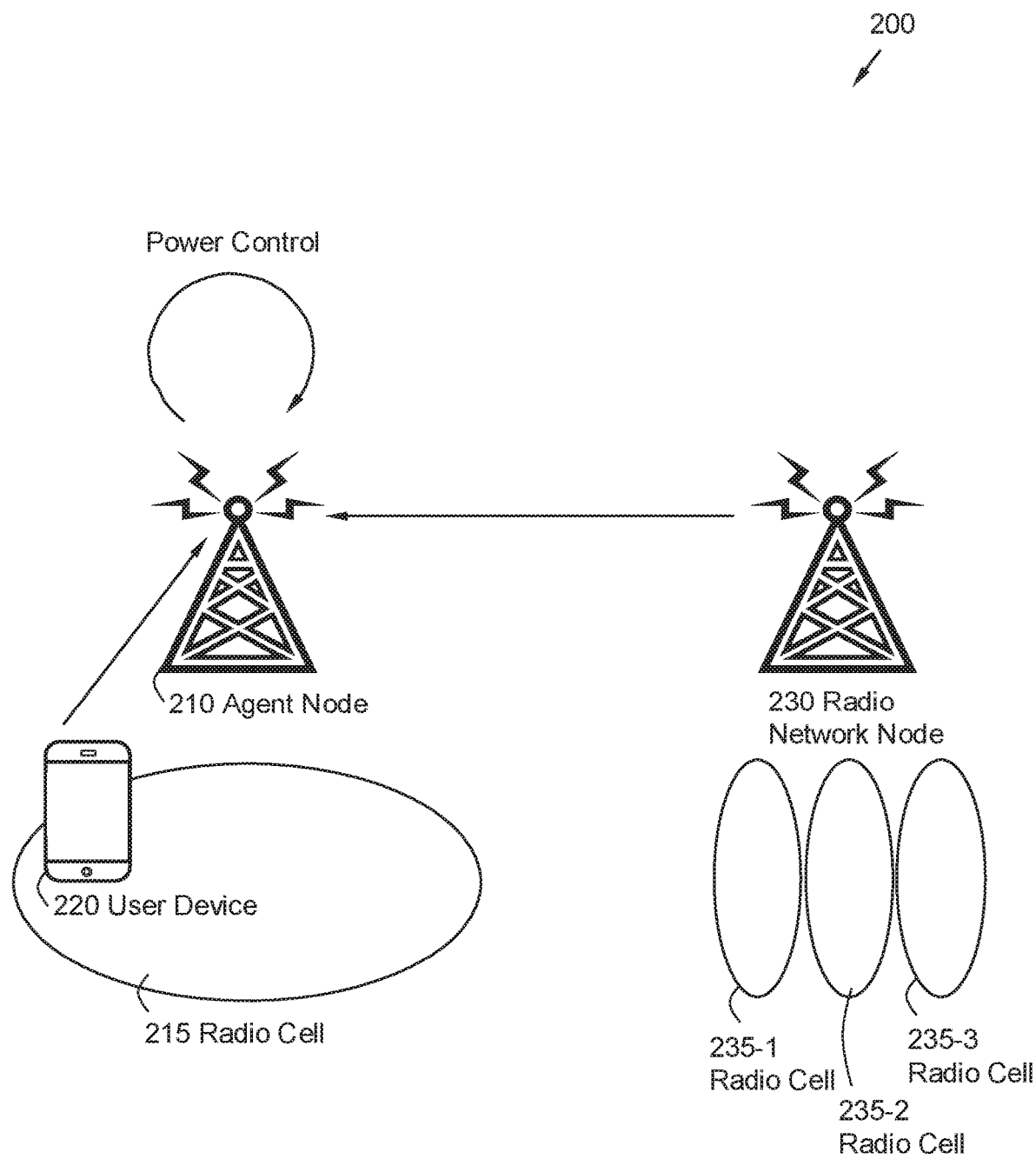
FIG. 1 is a block diagram illustrating a wireless communication network with an agent node controlling the downlink transmission power budget for a co-located radio cell.

FIG. 1 is a schematic illustration over a radio communication system 200 wherein the agent node 210 resides in a radio network node, such as an eNodeB of an LTE system, and controls radio resources of at least one radio cell 215 co-located with the radio access node. The radio resource of the cell 215 may be determined based on radio environmental measurements received from a user device 220 camping within the controlled radio cells 215, as well as based on information received by other radio network nodes 230 representing a performance measure associated to the communication system. The neighbour radio network node 230 in the illustrated example may control three radio cells 235-1, 235-2, 235-3.

A massive densification of radio access nodes in future radio communication systems 200 makes inter-cell interference management particularly difficult due to the potentially large number of interferers affecting the transmission to/from a user device 220, and therefore comes with a number of new challenges related to spectral efficiency and energy savings.

Solving this problem to optimality requires extensive channel state measurements correlating the channel quality experienced by each user device from multiple radio network nodes 230 (i.e., radio cells) to fully characterise the state of the system. Such measurements should be collected by a central node so as to jointly optimise the downlink power budget used by multiple radio network nodes 230. The signalling overhead to implement such solution makes it prohibitive already with slow varying radio channel.

The object of the herein disclosed embodiments is to provide a method which mitigates and/or solves the disadvantages of the prior art solutions. More specifically, it is herein disclosed a method for performing RRM based on learning a network environmental performance.

More specifically, it discloses a method for autonomously learning different radio resource management strategies using measurements and Key Performance Indicators (KPIs) collected from an algorithmic interaction with the radio environment. Such algorithmic interaction with the radio environment is based on ideas from machine learning and, more specifically, reinforcement learning and tailors them to the specifics of the radio communication system 200. Using the methodology proposed in this solution it is possible to design better solutions for the management of radio resources which are more performing and adaptive to the changing radio environment conditions.

Thereby autonomous learning is provided, leading to better performance and improved adaptability.

The disclosed embodiments comprise a general framework for resource management in a radio communication system 200 based on machine learning. The method may require two logical entities: the agent node 210 (e.g., an eNodeB), configured to interact with the radio environment and determine an action based on an associated control policy; and a trainer node (e.g., an eNodeB or a remote server) configured to learn initially only part and eventually all of such associated control policy based on observation of the state of the communication system 200 received from one or more agent nodes and the actions performed in the communication system 200.

The action taken by the agent node 210 according to the learned control policy may comprise either the change of a radio resource parameter (e.g., downlink transmission power of one or more eNodeBs, uplink transmit power of one or more user device 220, electrical tilt of one or more eNodeBs, etc.), the change of the parameter of a given control algorithms (e.g., one threshold value for performing hand over or selecting one or more radio frequency carrier to be assigned to the user device 220, typically threshold values related to Signal to Interference plus Noise Ratio (SINR), Signal to Noise Ratio (SNR or S/N), Reference Signal Received Power (RSRP), or any similar measurement or ratio related to a comparison of the power level of a desired signal with the level of undesired background noise, measured by the user device 220; or the allocation of a part of the shared radio resources (e.g. a time-frequency resource block) to a given user device 220.

Instead of RSRP, other similar measurements related to signal strength/quality may be used such as e.g. Received Signal Strength Indication (RSSI) and/or Received Channel Power Indicator (RCPI).

Further, instead of SNR or SINR, other similar signal to interference ratios may be utilised such as e.g. signal-to-interference ratio (SIR), Peak signal-to-noise ratio (PSNR), Signal-to-noise and distortion ratio (SINAD), or similar.

In the following, these types of actions for simplicity are referred to as adjustments of radio resource parameters.

In addition, embodiments herein further disclose an efficient method to exchange information related to the state of the communication system 200 either across agent nodes 210 or between the agent node 210 and the trainer node.

Additionally, the invention discloses a method for the trainer node to efficiently reconstruct a complete or partial state of the communication system 200 and store a sequence of such states and actions in order to learn a new control policy to be assigned to the agent node 210.

A method is therefore provided for control in the radio communication system 200 based on learning features characterising the state of the radio environment with limited signalling overhead and exploiting features to learn an optimal, or at least improved, control policy for radio cells 215, 235-1, 235-2, 235-3 in the radio communication system 200. In some embodiments, two logical entities may be involved: the agent node 210 (e.g., an eNodeB), configured to interact with the radio environment and determine an action for optimising/improving the assignment of radio resource parameter of one or more radio network nodes 230, based on a control policy.

The agent node 210 may be co-located with the radio network node 230 in some embodiments. However, in other embodiments, the agent node 210 may be a separate entity versus the radio network node 230. One agent node 210 may further control a plurality of radio cells either co-located 215 or not co-located 235-1, 235-2, 235-3. Thus the expression "radio network node" as utilised in this disclosure, may indicate both an agent node 210 co-located with a radio network node 230, or a separate radio network node 230.

The other logical entity is the trainer node (e.g., an eNodeB or a remote server in different embodiments), configured to learn a control policy based on e.g. observation/s of the state, performed actions and/or rewards received from the environment. In some embodiments, the trainer node may be co-located with the agent node 210. In other embodiments however, the agent node 210 and the trainer node may be separate entities.

In some embodiments, the trainer node may be kept in a centralised server room or similar, where it may withstand wind and weather while being appropriately protected from theft and damage. Further, appropriate maintenance and software updates may conveniently be performed by skilled personnel.

Further, in some embodiments, information associated with the state of the radio communication system 200, or a subset thereof, may be communicated or exchanged either among agent nodes 210 or between the agent node 210 and the trainer node.

Additionally, a method in the trainer node is disclosed, to efficiently reconstruct, store, and exploit knowledge of at least one part of the state of the communication system 200 to create a new control policy for RRM control of the radio cells 215, 235-1, 235-2, 235-3.

In some embodiments, the agent node 210 is configured to control a radio resource parameter of the agent node 210 or at least another radio network node. The agent node 210 is configured to receive a message from the user device 220 in radio cell 215 controlled by the agent node 210 comprising at least one radio environment measurement.

Further, the agent node 210 may be configured to receive, from at least one radio network node 230, a message comprising at least one network performance measurement, or local reward as it also may be referred to as, associated with the communication system 200, or a subset thereof, such as e.g. a subset of the communication system 200 wherein the cell 215, 235-1, 235-2, 235-3 is situated.

The agent node 210 may additionally be configured to determine at least one feature representing, partly or entirely, the state of the communication system 200 based on the received radio environmental measurement/-s and/or the at least one network performance measurement. Further, in some embodiments, the agent node 210 may also be configured to determine a control action associated with the radio cell 215, 235-1, 235-2, 235-3 in the communication system 200 based on the control policy, a set of available control actions, and at least one feature representing the state of the communication system 200, or a subset thereof. The agent node 210 may further be configured to configure the radio resource parameter associated to the radio cell 215, 235-1, 235-2, 235-3 based on the determined control action.

The radio resource parameter can be one or more of the subsequently enumerated examples. In some embodiments, the radio resource parameter may be a control parameter associated with downlink power control in one or more radio cells 215, 235-1, 235-2, 235-3, such a power control adjustment value for the downlink power budget, a power control adjustment value associated to at least one portion of the radio frequency spectrum utilised by one or more radio cells 215, 235-1, 235-2, 235-3.

Further, the radio resource parameter may be a control parameter associated with uplink power control in one or more use devices 210, such a power control adjustment value, a fractional pathloss adjustment value, an open-loop power control configuration value.

In some embodiments, the radio resource parameter may be a control parameter associated with allocation of shared radio resources of one or more radio cells 215, 235-1, 235-2, 235-3 to one or more user devices 220, such as time-frequency resource blocks.

In some alternative embodiments, the radio resource parameter may be a control parameter associated with electronic tilt of one or more antennae.

The radio resource parameter may, according to some embodiments comprise a control parameter for performing hand over or cell (re-)selection for the user device 220, such a threshold value of a signal strength indicator (e.g., RSRP, SINR, SNR, etc.), an offset value of a signal strength indicator (e.g., RSRP, SINR, SNR, etc.), a threshold value associated to the resource availability in the radio cells 215, 235-1, 235-2, 235-3, a threshold value associated with the expected data rate from the radio cell 215, 235-1, 235-2, 235-3, a threshold value associated with the experienced data rate from the radio cell 215, 235-1, 235-2, 235-3.

The radio resource parameter may optionally further comprise a control parameter associated with the allocation of radio resources for control channel signalling, such as the number of Orthogonal Frequency-Division Multiplexing (OFDM) symbols allocated to a physical downlink control channel, the number or the allocation of time-frequency resource groups for physical downlink control channel.

Furthermore, the radio resource parameter may comprise a control parameter associated with the allocation of resources for sounding reference signals associated to one or more user devices 220 in one or more radio cells 215, 235-1, 235-2, 235-3, such as the periodicity and distribution of the sounding signals over time and frequency.

The radio resource parameter may also in some embodiments comprise a control parameter associated to the numerology or type of waveform utilised in at least one portion of the frequency spectrum of one radio cell, such as the duration of a transmission time interval, the number of OPFDM symbols, the length of the cyclic prefix, and indication to enable/disable cyclic prefix, the duration of a symbol in time and frequency domain.

The radio network node 230 can be designated as a base station, e.g. a Radio Base Station (RBS), which in some networks may be referred to as transmitter, "eNB", "eNodeB", "NodeB" or "B node", depending on the technology and terminology used. The radio network nodes 230 may be of different classes such as e.g. macro eNodeB, home eNodeB or pico base station, based on transmission power and thereby also cell size. One or more radio cells 235-1, 235-2, 235-3 can be controlled by one radio network node 230, or possibly agent node 210, such as e.g. a tri-sectorial radio site.

The communication system 200 may at least partly be based on radio access technologies such as, e.g., 3GPP LTE, LTE-Advanced, Evolved Universal Terrestrial Radio Access Network (E-UTRAN), Universal Mobile Telecommunications System (UMTS), Global System for Mobile Communications (originally: Groupe Special Mobile) (GSM)/Enhanced Data rate for GSM Evolution (GSM/EDGE), Wideband Code Division Multiple Access (WCDMA), Time Division Multiple Access (TDMA) networks, Frequency Division Multiple Access (FDMA) networks, Orthogonal FDMA (OFDMA) networks, Single-Carrier FDMA (SC-FDMA) networks, Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 1×RTT and High Rate Packet Data (HRPD), just to mention some few options. The expressions "wireless communication network", "wireless communication system" and/or "cellular telecommunication system" may within the technological context of this disclosure sometimes be utilised interchangeably.

It is to be noted that the illustrated network setting of one agent node 210, one radio network node 230 and one user device 220 in FIG. 1 is to be regarded as a non-limiting example of an embodiment only. The radio communication system 200 may comprise any other number and/or combination of agent nodes 210, radio network nodes 230 and/or user devices 220. A plurality of user devices 220 and another configuration of radio network nodes 230 and/or agent node 210 may thus be involved in some embodiments of the disclosed invention.

Thus whenever "one" or "a/an" user device 220, radio network node 230 and/or agent node 210 is referred to in the present context, a plurality of user devices 220, radio network nodes 230 and/or agent nodes 210 may be involved, according to some embodiments.

The set of available discrete control actions $\mathcal{A} = \{a_i\}_{i=1}^{A}$ may comprise positive or negative offset values to be applied to the current radio resource parameter value. Each value may therefore correspond to increase (positive offset), decrease (negative offset) or hold (zero offset) the current parameter value. The parameter values can equivalently be expressed in binary, linear, logarithmic (decibel), or other suitable scales. Moreover, typically a radio environmental parameter may have a feasible range of variable which defines the domain of the parameter. In one example, the radio cells 235-1, 235-2, 235-3 may transmit power budget as the control parameter takes minimum and maximum feasible values in the range [10 dB, 46 dB] and the set of available power control actions may comprise the values $\mathcal{A} = \{0, \pm 1, +3\}$ dB.

Furthermore, the feasible range of the radio resource parameter may further depend on the current state of the communication system 200. In one example, the transmit power budget of radio cells 235-1, 235-2, 235-3 may be as the control parameter and the current value of the transmit power is a part of the state at a time t. Then the set of available power control actions to be taken at time t, further may depend on the current value of the power budget. For instance, if the current value of the power budget is 46 dB then the set of available power control actions (according to the previous example) may be limited to $\mathcal{A} = \{0, -1, -3\}$ dB.

In another example the control variable might be the threshold parameter for triggering a HandOver and have a similar set of available control actions comprising the offsets $\mathcal{A} = \{0, \pm 1, \pm 3\}$ dB. In another example the actions might consist in the downlink or uplink allocation of time-frequency resource blocks to the user devices 220. In such case the set of actions would consist of the Cartesian product of the available resource blocks (RBs) and user devices 220: $\mathcal{A} = \{RBs\}_{k=1}^{K} \times \{UEs\}_{n=1}^{N}$.

In some embodiments of the invention, the agent node 210 may be configured to determine a control action for controlling a radio resource parameter for at least one radio cells 235-1, 235-2, 235-3 controlled by the radio network node 230, not co-located with the agent node 210.

Further according to some embodiments, the agent node 210 may be configured to transmit a control message to the radio network node 230 comprising at least said radio resource parameter adjustments.

Figure 2:
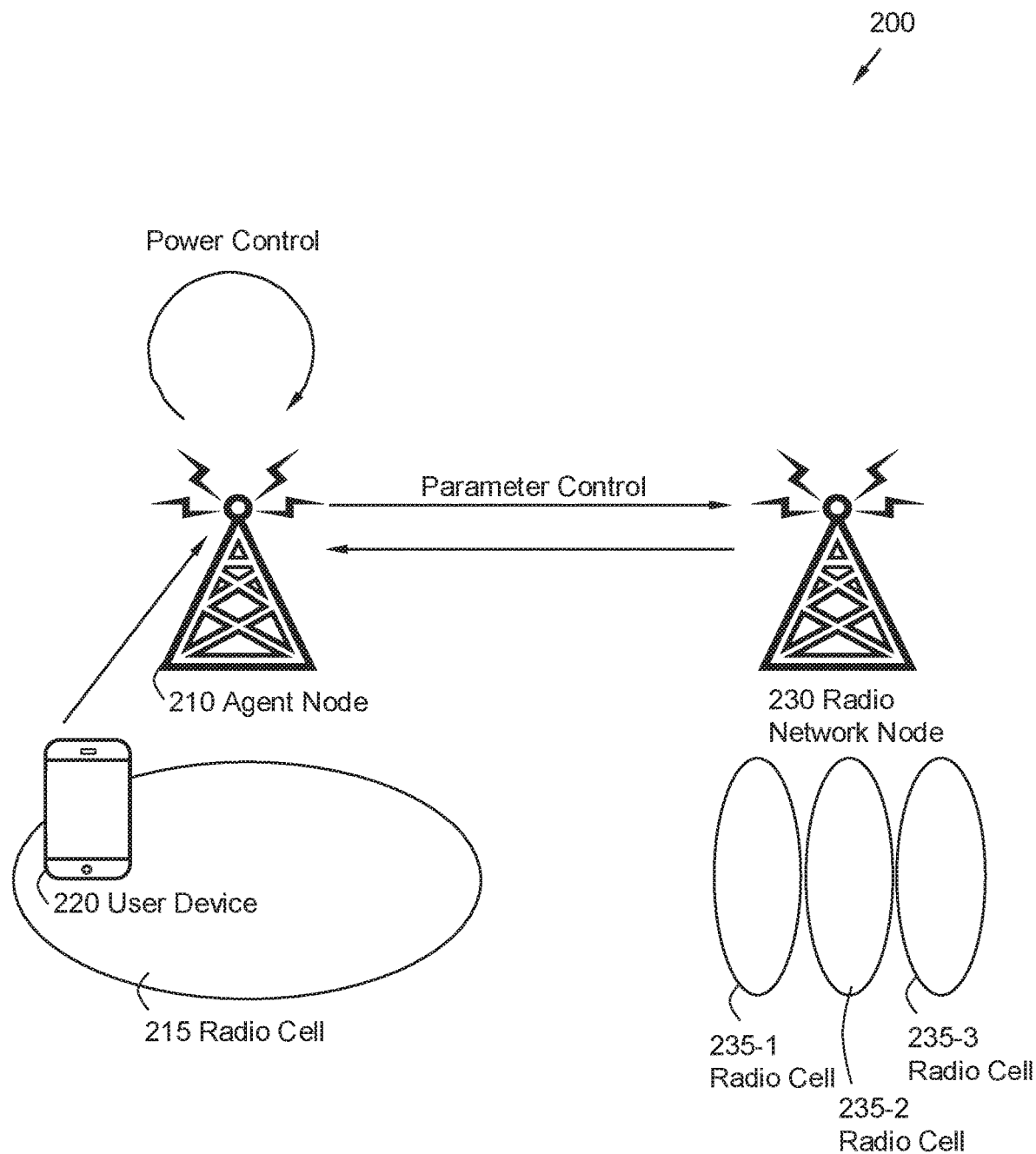
FIG. 2 is a block diagram illustrating a wireless communication network with an agent node controlling the downlink transmission power budget of a non co-located radio cell.

FIG. 2 illustrates an embodiment wherein the agent node 210 is not co-located with the radio network node 230. In this case the agent node 210 controls the radio resource parameter associated with at least one radio cell 235-1, 235-2, 235-3 not co-located with the agent node 210. The advantage of this embodiment is to enable centralised control of a plurality of radio network nodes 230, with the aim of improving KPIs like the spectral efficiency of the system 200, the satisfaction of Quality and Service (QoS) requirements and the fairness of the distribution of resources across user devices 220.

Additionally, the control message of the agent node 210 may further comprise an indication of time associated with the control action, such as a starting time indicating when to apply the control action and a window indicating the validity of the control action. Furthermore, the control message may comprise additionally comprise a list of control actions and an associated indication of time. The control actions may further be associated with one or more radio cells 235-1, 235-2, 235-3 controlled by the radio network node 230, or a plurality of radio network nodes 230.

The agent node 210 may determine a set of features $\mathcal{F} = \{f_j\}_{j=1}^F$ wherein each feature $f_j$ is used to represent part of the state $s_t$ of the communication system 200 at a given time t. Each feature $f_j \in \mathcal{F}$ can be determined based on radio measurements received from user devices 220 within one or more radio cells 215, 235-1, 235-2, 235-3 controlled by the agent node 210 or based on measurements associated with the communication system 200 received from the at least one radio network node 230. For instance, the set of features $\mathcal{F} = \{f_j\}_{j=1}^F$ may comprise one or more of the following features, depending on the radio resource parameter being controlled.

Thus the set of features may comprise an indicator of the downlink transmission power associated with the at least one radio cell 215 controlled by the agent node 210. Further, the set of features may comprise an indicator of the downlink transmission power associated with at least one radio cell 235-1, 235-2, 235-3 controlled by the radio network node 230 non co-located with the agent node 210. Also, the set of features may comprise an indicator of the average, minimum, or maximum Reference Signal Received Power (RSRP) associated with the user devices 220 within at least one radio cell 215, 235-1, 235-2, 235-3 controlled by the agent node 210. The set of features may optionally comprise an indicator of the measured interference associated to the radio cell 215 controlled by the agent node 210 and at least one neighbouring cell, such as the average, minimum or maximum interference. The interference may thereby be measured by the user devices 220 within the at least one radio cell 215, 235-1, 235-2, 235-3 controlled by the agent node 210 and reported to the agent node 210. Furthermore, the set of features may also comprise an indicator of the average, minimum or maximum Signal to Noise Ratio (SNR) associated with the user devices 220 within at least one radio cell 215, 235-1, 235-2, 235-3 controlled by the agent node 210. Additionally, the set of features may comprise an indicator of the average, minimum or maximum Signal to Interference plus Noise Ratio (SINR) associated with the user devices 220 within at least one radio cell 215 controlled by the agent node 210. The set of features may further comprise an indicator of the reward function associated with the radio cell 235-1, 235-2, 235-3 controlled by the radio network node 230. Also, the set of features may further comprise the number of active user devices 220 in the radio cell 215, 235-1, 235-2, 235-3. In further addition, the set of features may optionally comprise the type of traffic of the active user devices 220 in the radio cell 215, 235-1, 235-2, 235-3. The set of features may also comprise the traffic load of the radio cell 215, 235-1, 235-2, 235-3 associated with one or more frequency carrier. In addition, the set of features may further comprise resource utilisation within the radio cell 215, 235-1, 235-2, 235-3, such as an indication of the average, maximum, or minimum resource utilisation. The set of features may comprise an indication of the electrical tilt associated with one or more radio cells 215, 235-1, 235-2, 235-3.

More generally, the set of features may comprise a list of radio control parameters associated with one or more radio resource management algorithms to be controlled by the agent node 210. In one example, for HandOver or cell reselection algorithms, the set of features may comprise threshold values or measurement gaps related to SINR, SNR, RSRP, or other measurements of signal strength from the user device 220 to one or more radio network nodes 230.

Thereby, the radio environmental measurement received from user devices 220 with the radio cell 215, 235-1, 235-2, 235-3 controlled by the agent node 210 may comprise at least one or more in the group of: a measurement of the RSRP associated to at least one radio cell 215 controlled by the agent node 210 (specifically, useful signal); a measurement of RSRP associated to at least one neighbouring cell (i.e., interference); a measurement of the SNR associated to at least one radio cell 215 controlled by the agent node 210; and/or a measurement of the SINR associated to at least one neighbouring cell controlled by the agent node 210.

The agent node 210 can further determine/characterise the state $s_t$ associated with part or the entire communication system 200 at a given time t by selecting a subset of features $f_j \in \mathcal{F}$, i.e. $s_t = \{f_{k,t}\}_{k \in \mathcal{S}}$ with $\mathcal{S} \subseteq \mathcal{F}$ and $f_{k,t}$ indicating the value of feature $f_k \in \mathcal{S}$ at time t. Thereby, the state of the communication system 200 can be represented by different combinations of features and different number of features. Each feature may comprise a measurement or a function of some radio measurements.

The agent node 210 is further configured to determine a performance measurement $r_t$, which may be referred to as a reward associated with one or more radio cells 215, 235-1, 235-2, 235-3 in the communication system 200 at a given time t given the power control action $a_t \in \mathcal{A}$ taken at time t and the state $s_t$ of the communication system 200 at time t, i.e., $r_t = g(a_t, s_t)$. Rather than explicitly modelling the dependency of $r_t$ on the state and power control action, the agent node 210 can estimate the cell performance measurement $r_t$ based on the radio environmental measurements $x_i \in X$ received by the user devices 220 served by the radio cell 215, 235-1, 235-2, 235-3. In other words, the user measurements may provide observations of the cell state and reward at time t+1 resulting from the application of the control action $a_t$ in state $s_t$ at time t, in some embodiments.

In one embodiment, the agent node 210 determines the performance measurement $r_t$ associated with the controlled radio cell 215, 235-1, 235-2, 235-3 as weighted sum of the state observations $x_i \in X$ parametrised by a scalar coefficient $\alpha \in [0, \infty)$ and transformed by a concave increasing function $h_i$.

$$r_t(x) = \frac{1}{1-\alpha} \sum_{x_i \in X} w_i (h_i(x_i)^{1-\alpha} - 1) \quad \alpha \in [0, \infty) \quad [1]$$

where $w_i$ is a weight associated to the radio environmental measurement of user i, and $x = [x_1, \ldots x_{|x|}]$ is a vector comprising the radio environmental measurements of all user devices 220, used for the definition of the reward function $r_t(x)$.

In one non-limiting exemplifying case, the function and $h_i(x_i)$ represents the average data throughput of user i in the radio cell 215, 235-1, 235-2, 235-3 and the reward $r_t(x)$ in equation [1] can be approximated for different values of a and weights $w_i$ with e.g. any, some or all of the following expressions: The average data throughput associated with the user devices 220 in the radio cell 215, 235-1, 235-2, 235-3, i.e., $$r_t(x) = \frac{1}{|x|} \sum_{x_i \in X} h_i(x_i), \text{ if } \alpha = 0, w_i = \frac{1}{|x|}$$

for all i; The average data throughput associated to the radio cell 215, 235-1, 235-2, 235-3, i.e., $r_t(x)=\Sigma_{x_i \in X} h_i(x_i)$, if a=0, $w_i$=1 for all i; The average log-transformed data throughput associated to the user devices 220 in the radio cell 215, 235-1, 235-2, 235-3, i.e., $$r_t(x) = \frac{1}{|X|} \sum_{x_i \in X} \log(h_i(x_i)),$$

if a=1, $w_i$=1/|X| for all i; The average sum of log-transformed data throughput associated with the radio cell 215, 235-1, 235-2, 235-3, i.e., $r_t(x)=\Sigma_{x_i \in X} \log(h_i(x_i))$, if a=1, $w_i$=1 for all i; The average harmonic data throughput associated with the user devices 220 in the radio cell 215, 235-1, 235-2, 233-3, i.e., $$r_t(x) = \frac{|X|}{\sum_{x_i \in X} h_i(x_i)^{-1}},$$

if a=2, $w_i$=1/|X| for all i; The average harmonic data throughput associated with the radio cell 215, 235-1, 235-2, 235-3, i.e., $$r_t(x) = \frac{1}{\sum_{x_i \in X} h_i(x_i)^{-1}},$$

$w_i$=1 for all i.

Each reward expression enables the agent node 210 to optimise a different performance metric that can either be associated with individual user devices 220, to radio cells 215, 235-1, 235-2, 235-3, or the communication system 200 as a whole.

The power control policy is a function, mapping the state of the communication system 200 to the set of the available actions. The power control policy may be e.g. deterministic, stochastic, probabilistic or a combination thereof.

In one embodiment of the invention, the power control policy may be represented by one or more neural network, wherein each neural network comprises an input layer comprising a set of input units, a set of hidden layers each consisting a set of hidden units, and one output layer consisting of one or more output units. Each neural network may be represented by a set of weights $W=\{w^{(1)}, \ldots, w^{L-1}\}$, with $w^{(l)}=[w_1^{(l)}, \ldots, w_{N_l}^{(l)}]^T$ denoting a $N_l \times 1$ real-valued vector whose components represent the weights between units of layer l and units of layer l+1. Furthermore, the neural network may be represented by an activation function, possibly S-shaped, which introduces a non-linearity in transforming the input received by the unit into its output.

The agent node 210 can be configured with a codebook of neural networks $\mathcal{N}$ indexed by n=1, . . . , N, eventually of different size (i.e. with different number of hidden layer, and with different number of units in the input, output and hidden layers).

In one embodiment, the agent node 210 determines a control action by inputting at least one neural network associated with a Q-value function, with at least one action $a_i \in \mathcal{A}$ and with at least a feature $f_j \in X$. The output layer of each neural network n determines a real-value $q_{a_i}^{(n)} \in [0, 1]$ associated with the corresponding control action $a_i$ inputted at the input layer. The value $q_{a_i}^{(n)}$ represents the cumulative discounted reward that the agent node 210 is expected to achieve by choosing the control action $a_i$ and following the policy implemented by the neural network n afterwards.

Therefore, in one embodiment, the agent node 210 may be configured with a control policy represented by a single neural network and determine the control action $a_i$* with the maximum likelihood coefficient as:

$$a_{i*} = \underset{a_i}{\mathrm{argmax}}\, q_{a_i} \quad [2]$$

In one alternative embodiment, the agent node 210 may be configured with a control policy represented by a neural network and determine a power control action $a_i$* based on the following steps of determine, for each neural network n representing the control policy, the control action $a_i$*$^{(n)}$ with the maximum q-value based on equation [2]. A next step may be to choose the control action $a_i$* as the one that has been selected by largest number of neural networks (e.g., majority vote). If two or more actions have been selected by an equal number of neural networks with majority vote, one of said actions may be chosen at random with equal probability, in some embodiments.

An advantage of this described alternative embodiment may be a possibility of correcting errors of some neural networks which might have learned an incorrect policy in some parts of the state space.

In one alternative embodiment, the control policy may be represented by one or more decision forests, with each decision forest comprising a set of decision trees, wherein each decision tree is characterised by a number of nodes each of which splits the incoming data into two subsets based on a threshold value. The data samples provided to each node of a decision three comprises a set of features $f_j \in \mathcal{F}$. The data may be split based on a split function defined on a subspace of the feature space. Such subspace may be created by selecting at random one or more features of the full feature space $\mathcal{F}$ and at random one or more parameters of the split function characterising (but not limited to) one of the following split criterion: axis aligned split (i.e., either vertical or horizontal alignment), one parameter indicates a feature value $f_j \in \mathcal{F}$; linear split, wherein at least two parameters define the slope and the intercept value of a linear function of the features; and/or quadratic split, wherein at least three parameters define a quadratic function of the features.

An information gain criterion may determine which features or the parameters characterising of the split function, to be chosen at random. Additionally, a stopping criterion may be used to determine the depth of the decision forest, such as maximum depth, minimum information gain or minimum number of data samples to be split.

The control policy can be learned by the agent node 210 based on the available radio measurements received from user devices 220 in the radio cells 215, 235-1, 235-2, 235-3 controlled by the agent node 210. In an alternative embodiment, the agent node 210 may receive a message comprising the control policy.

Therefore, in one embodiment of the invention, the agent node 210 may be further configured to: receive, from a trainer node, a control message comprising a control policy for adjusting a radio resource parameter regulating the radio resources parameter (like downlink power) or the threshold of an algorithm managing some radio resources or the allocation of a time-frequency resource block to a given user device 220.

The received control action can be associated with one or more radio cells 215 controlled by the agent node 210, or with one or more radio network nodes 230 controlled by the agent node 210. The embodiment is illustrated in FIG. 3 wherein the control message comprising a control policy 430 is transmitted by the trainer node 400 to the agent node 210.

Figure 3:
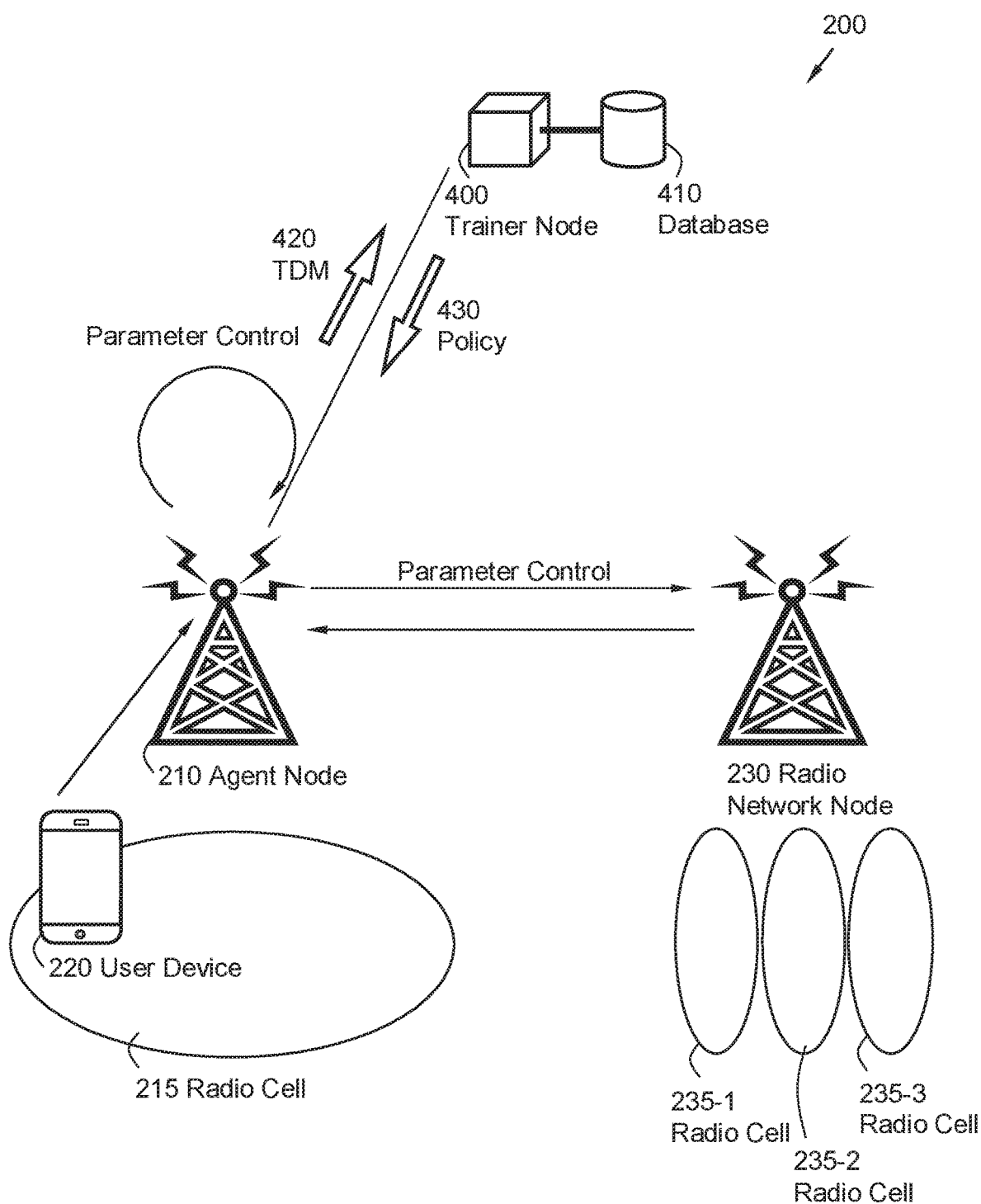
FIG. 3 is a block diagram illustrating a wireless communication network illustrating interaction between agent node and trainer node.

FIG. 3 illustrates an example of interaction between the agent node 210 and the trainer node 400 in the communication system 200.

Furthermore, the control policy 430 may be represented by one or more of: a message indicating a neural network architecture (specifying input, hidden layers, output and number of neurons or units per layer, and activation function). The control policy 430 may further be represented by at least one neural network indicator indicating one neural network in the codebook of neural networks $\mathcal{N}$ already available for the agent node 210. In some embodiments, the control policy 430 may be represented by at least one set of neural network weights W to be configured for at least one neural network associated with the control policy (the neural network may further be addressed by the neural network indicator in some embodiments). The control policy 430 may alternatively be represented by a number of neural networks to be configured for controlling the action; an indicator configuring a combining method for the agent node 210 to aggregate the results produced by individual neural networks for determining the control action. For example, the agent node 210 may be configured with a set of combining methods, such as majority voting, weighted majority voting and/or borda counting. The control policy 430 may be represented by an indicator of the activation function for neurons in at least one neural network. Also, the control policy 430 may be represented by an indicator of a parameter representing/associated with an axis aligned data split function for a control policy based on a decision forest. The control policy 430 may furthermore be represented by an indicator of at least two parameters representing/associated with a linear data split function for the control policy 430 based on a decision forest. Also, the control policy 430 may furthermore be represented by an indicator of a parameter representing/associated with a quadratic data split function for the control policy 430 based on a decision forest. The control policy 430 may in addition be represented by an indication one or more hyper-parameters characterising a decision forest in the group of: maximum or minimum depth of the decision forest; depth of the decision forest; maximum or minimum number of decision trees; number of decision trees in the decision forest; information gain criterion; at least one indication of the stopping criteria to determine the depth of the decision forest.

In some embodiments of the invention, the agent node 210 may be further configured to receive, from the trainer node 400, a control message 430 further comprising an exploration-to-exploitation control parameter $\epsilon$ associated with the control policy. Also, the agent node 210 may be configured to determine whether to apply the control policy 430 based on the exploration-to-exploitation control parameter $\epsilon$.

The exploration-to-exploitation control parameter $\epsilon$ may indicate how often in average the control policy 430 should be used compared to an alternative control policy 430, such as, for instance, selecting a random action in the set $\mathcal{A}$. The advantage of this method is to allow the exploration of new states of the communication system 200 that would otherwise not be observed by the agent node 210 by using always the received control policy 430.

In some embodiments, the agent node 210 is further configured to determine a Training Data Message (TDM) 420 comprising at least an indication of: The state $s_t$ of the communication system 200 measured at a certain time t; The control action $a_t$ taken by the agent node 210 at time t; The state of the communication system 200 $s_{t+1}$ measured after the control action; A measurement of the system performance $r_{t+1}$ i.e. the reward associated with the new state of the communication system 200 and the control action. The determined training data message 420 is then transmitted to the trainer node 400.

The training data message 420 may furthermore be associated with one or more radio cells 215, 235-1, 235-2, 235-3 or with one or more radio network nodes 210, 230, in the communication system 200. Thereby, the training data message 420 may provide observations of the state of the communication system 200 associated with the control action taken by one or more radio cells 215, 235-1, 235-2, 235-3 or radio network nodes 210, 230. This embodiment, enables the trainer node 400 to efficiently adapt the control policy to changes in the communication system 200 so as to optimise the system performance.

The trainer node 400 may further be configured to: receive, from at least one agent node 210, at least one training data message 420; determine a control policy 430 associated with at least one radio cell 215, 235-1, 235-2, 235-3 in the communication system 200 based at least on the received training data message 420; transmit, to the agent node 210, a control message comprising the control policy 430 for optimising the radio resource parameter.

The training data message may further carry a batch of training data, i.e. a set of quadruplets $\{(s_t, a_t, s_{t+1}, r_{t+1})\}_{t=1}^{T}$ associated with T≥1 observations of the state transition due to the control action.

The radio cell 215, 235-1, 235-2, 235-3 associated with the control policy 430 can either be controlled by the agent node 210 or by another radio network node 230 controlled by the agent node 210. In the latter case, the agent node 210 may transmit to the radio network node 230 control commands associated with the radio cell 235-1, 235-2, 235-3 computed based on the control policy 230 according to former embodiments of the invention.

Figure 4:
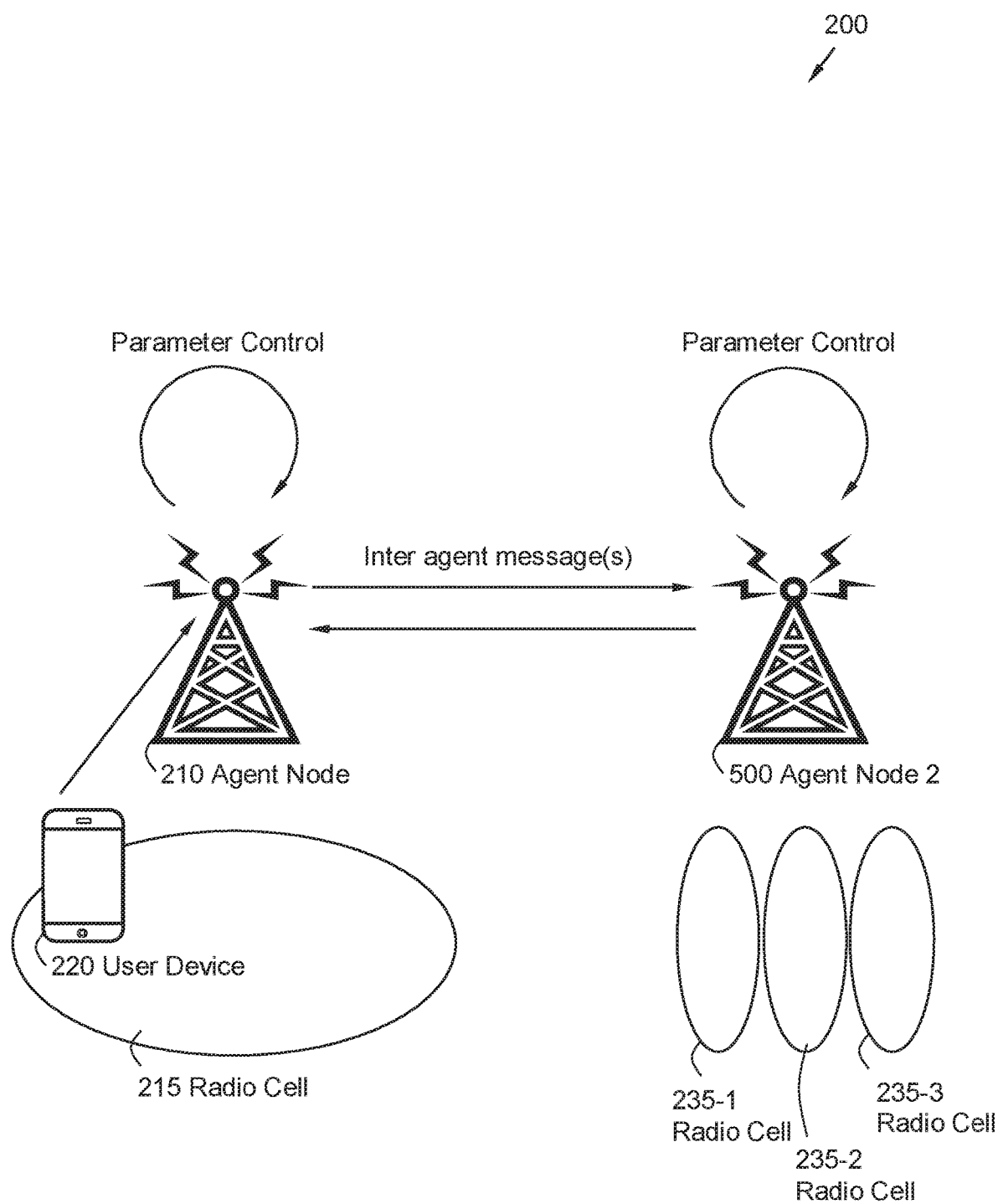
FIG. 4 is a block diagram illustrating a wireless communication network with multiple agent nodes.

FIG. 4 illustrates interaction between the first agent node and a second agent node 500 in the communication system 200, e.g., via the X2 interface of an LTE system, or the S1 interface.

In one embodiment of the invention, the agent node 210 may be further configured to determine at least one inter-agent message comprising of at least one of the following items: a network performance measurement (local reward) associated with the radio cell/-s 215 controlled by the agent node 210; a control message comprising the current control policy 430; and/or a Training Data Message (TDM).

The agent node 210 may furthermore be configured to transmit the message/s to at least another agent node 500 which can be represented by the radio network node 230 previously mentioned, or being co-located with the trainer node 400. Upon receiving this information, the second agent node 500 may further determine a performance measurement $r_s$ associated with at least one part or the whole communication system 200 (e.g., a group of more than one radio cell 215, 235-1, 235-2, 235-3) based on the at least one (local) reward received by the first agent node 210 and the performance measurement $r_t$ associated to at least one radio cell 235-1, 235-2, 235-3 controlled by the second agent node 500.

In some embodiments, the control policy for the agent node 210 may be determined by the trainer node 400 upon receiving at least one data training message 420.

The control policy 430 could additionally be associated to a group of more than one radio cell 215, 235-1, 235-2, 235-3. In one example, the control policy 430 may be associated with a group of three radio cells 235-1, 235-2, 235-3 co-located in a tri-sectorial radio network node 235. The agent node 210, 500 can either reside in said radio network node 230 or control said radio network node 230 in different embodiments.

In one implementation of the embodiment, the trainer node 400 may determine a new control policy 430 based on the new training data comprised on the received training data message 420 and based on formerly received training data. The received training data 420 is thereafter stored by the trainer node 400, for instance in a database 410, to be available for future derivations of the control policy 430. The training data stored by the trainer node 400 may be received from one or more agent nodes 210, 500 and thereby be associated with different radio cells 215, 235-1, 235-2, 235-3 or different radio network nodes 210, 230, 500 in the communication system 200.

In one embodiment of the invention, the training node 400 may be further configured to determine an exploration-to-exploitation control parameter $\epsilon$ associated with the control policy 430; and transmit, to the agent node 210, a control message further comprising the exploration-to-exploitation control parameter $\epsilon$.

The exploration-to-exploitation control parameter $\epsilon$ regulates the utilisation of the control policy 430 at the agent node 210. In one exemplifying case, exploration-to-exploitation control parameter $\epsilon$ may take values in the interval $\epsilon \in [0, 1]$ (with zero and one included in the interval). Thereby, a given value of the exploration-to-exploitation control parameter $\epsilon$ indicates how often in average the control policy 430 should be used compared to an alternative control policy, such as, for instance, selecting a random action in the set $\mathcal{A}$. Thereby, a value $\epsilon$=0.2 may indicate to the agent node 210 to select a control action $a_t \in \mathcal{A}$ based on the received control policy 430 in 80% of the times, whilst selecting a control action $a_t \in \mathcal{A}$ at random in 20% of times (or vice versa).

The advantage of this embodiment is to allow the exploration of states of the communication system 200 that would otherwise not be observed by the agent node 210 and the trainer node 400. The explored states of the communication system 200 may be reported by the agent node 210 to the trainer node 400 via the training data message 420 according to previously described embodiments.

An efficient control of the exploration versus exploitation trade-off may be an advantage as exploring at random the states of the communication system 200 may lead to degradation of the system spectral efficiency. Thereby, in one embodiment of the invention, the exploration-to-exploitation control parameter $\epsilon$ is gradually reduced over time according to a predefined method so as to gradually reduce exploration of the unknown state space and gradually increase exploitation of the control policy 430. In one example, the exploration-to-exploitation control parameter $\epsilon_k$ updated every time an action is selected may be computed as:

$$\epsilon_k = \lambda \epsilon_{min} + (1 - \lambda) \epsilon_{max}, \lambda = \min\left(1, \frac{k}{N}\right),$$

wherein $\epsilon_{min}$ represents a minimum value of the exploration-to-exploitation control parameter that the agent node 210 will preserve once the main exploration phase is completed, $\epsilon_{max}$ is the largest epsilon value with which the agent node 210 will start. Here k≥0 is a discrete counter representing the number of actions executed up until the current time, and N is the total number of actions during which the annealing from $\square_{max}$ to $\epsilon_{min}$ should take place.

The trainer node 400 can determine the optimal control policy 430 based on a Reinforcement Learning (RL) algorithm. The reinforcement learning algorithm solves the problem of associating the experienced reward to the control actions that, taken in a given state of the system 200, lead to that reward. The control policy 430, resulting from a reinforcement learning algorithm, maps a given system state to the action to be taken (among the available set of actions) in order to maximise the cumulative reward.

Some of the most popular methods in RL are critic-only methods. They are based on the idea of finding an optimal value function and then deriving a policy from it.

Possibly the most well-known of the critic-only algorithms is that of Q-learning. A Q-value function is a prediction of future reward, more precisely the Q-value function tries to learn "how much total reward can I expect from taking action a in state s and following the policy π".

By extracting a Q-function, rather than learning directly what action to take in a given state, it may be learned how valuable it is to take an action in a given state and then derive a policy from it.

The Q-value function associated with taking action a in state s, following the policy π and with discount factor γ is written as:

$$Q^\pi(s,a) = E[r_{t+1} + \gamma r_{t+2} + \gamma^2 r_{t+3} + \ldots | s, a]$$

Such Q-value function can be learned by the method of the temporal differences:

$$Q(s_t, a_t) \leftarrow Q(s_t, a_t) + \alpha(r_{t+1} + \gamma \max_{a' \in A} Q(s_{t+1}, a') - Q(s_t, a_t))$$

The difference may be calculated as the discrepancy between the Q-value predicted by the Q-value function at time step t, that is $Q(s_t, a_t)$ and the actual reward plus discounted Q-value at time step t+1, that is $r_{t+1} + \gamma \max_{a' \in A} Q(s_{t+1}, a')$.

Such discrepancy between what is predicted and what is actually experienced is used to correct (after multiplication with a certain learning rate α) the estimated Q-function and bring it closer to the true Q-function which is to be learned. The algorithms described above assumed that the value function may somehow be represented in an appropriate way, e.g., by storing it in a table. However, in practice state spaces might become very large or even infinite so that a table based representation is not possible. Moreover, filling these large tables would require a huge amount of observed transitions. To overcome this problem, value functions are typically represented in terms of parameterised function approximators, e.g., linear functions or, as mentioned in this description, neural networks. Instead of updating individual entries of the value functions, the parameters of the function approximator are changed using gradient descent to minimise the error:

$$L = \frac{1}{2}[r + \max_{a'} Q(s', a') - Q(s, a)]^2,$$

where $r + \max_{a'} Q(s', a')$ is the target and $Q(s, a)$ is the prediction.

Figure 5:
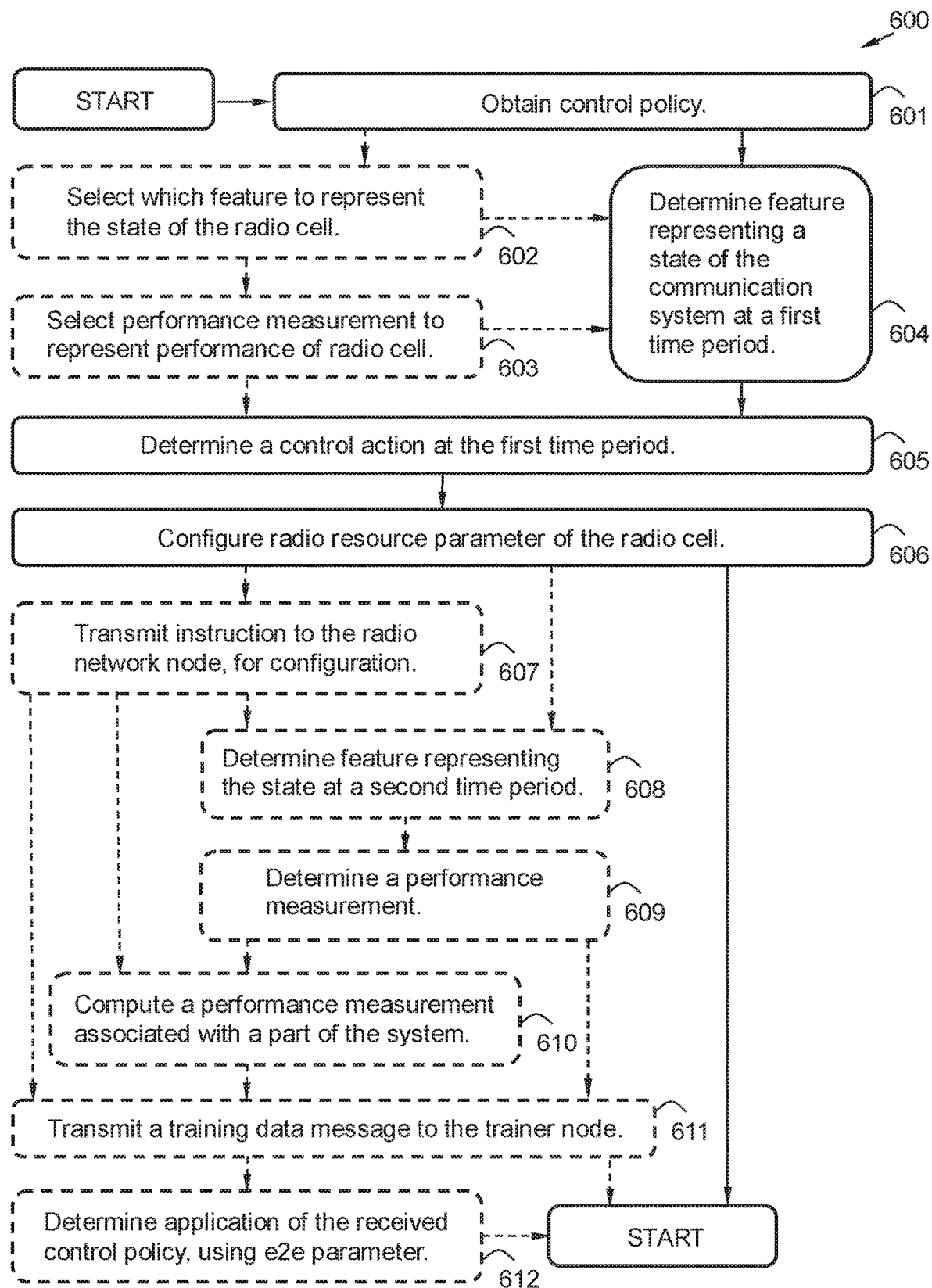
FIG. 5 is a flow chart illustrating a method in an agent node according to an embodiment of the invention.

FIG. 5 is a flow chart illustrating embodiments of a method 600 in an agent node 210 for configuring a radio resource parameter of a radio cell 215, 235-1, 235-2, 235-3 of a communication system 200. The radio cell 215, 235-1, 235-2, 235-3 is controlled by the agent node 210 or in some embodiments by another agent node 500, or alternatively by a network node 230. The agent node 210 may be co-located with a trainer node 400 and/or the network node 230 controlling the radio cell 215, 235-1, 235-2, 235-3 in some embodiments. Alternatively, the agent node 210 may be situated at a distance from the trainer node 400 and/or the network node 230.

The communication system 200 may be based on 3GPP LTE. Further, the wireless communication system 200 may be based on Frequency-Division Duplex (FDD) or Time Division Duplex (TDD) in different embodiments.

To appropriately configure the radio resource parameter instruction of the radio cell 215, 235-1, 235-2, 235-3, the method 600 may comprise a number of steps 601-612.

It is however to be noted that any, some or all of the described steps 601-612, may be performed in a somewhat different chronological order than the enumeration indicates, be performed simultaneously or even be performed in a completely reversed order according to different embodiments. Some actions such as e.g. step 602-603, 607-612 may be performed within some, but not necessarily all embodiments. Further, it is to be noted that some actions may be performed in a plurality of alternative manners according to different embodiments, and that some such alternative manners may be performed only within some, but not necessarily all embodiments.

The agent node 210 may in some embodiments periodically re-perform any, some or all of step 601-612, thereby enabling application of a new control policy 430 according to some embodiments. The method 600 may comprise the following steps:

Step 601 comprises obtaining the control policy 430. The control policy 430 may be received from the trainer node 400.

In some embodiments wherein the radio network node 500 controlling the radio cell 235-1, 235-2, 235-3 to be controlled is another agent node 500, the control policy 430 to be utilised for configuring the radio resource parameter in the radio cell 235-1, 235-2, 235-3 of the other agent node 500 in the communication system 200, obtained from the trainer node 400, may be forwarded to the other agent node 500.

The control policy 430 may be obtained iteratively in some embodiments.

The obtained control policy 430 may be represented by one or more of: an indicator configuring a combining method for the agent node 210, 500 to aggregate results produced by individual neural networks for determining the control action; an indicator of the activation function for neurons in at least one neural network; an indicator of a parameter representing an axis aligned data split function for the control policy 430 when based on a decision forest; an indicator of at least two parameters representing a linear data split function for the control policy 430 based on the decision forest; an indicator of a parameter representing a quadratic data split function for the control policy 430 based on the decision forest; an indication one or more hyperparameters characterising the decision forest in the group of: maximum or minimum depth of the decision forest; depth of the decision forest; maximum or minimum number of decision trees; number of decision trees in the decision forest; information gain criterion; at least one indication of the stopping criteria to determine the depth of the decision forest.

According to various embodiments, the obtained control policy 430 may further comprise: an adjustment of the set of available control actions associated with the radio cell 215, 235-1, 235-2, 235-3; an indicator configuring a combining method for the agent node 210, 500 to aggregate results produced by individual neural networks for determining the control action; an indicator of the activation function for neurons in at least one neural network; an indicator of a parameter representing an axis aligned data split function for the control policy 430 when based on a decision forest; an indicator of at least two parameters representing a linear data split function for the control policy 430 based on the decision forest; an indicator of a parameter representing a quadratic data split function for the control policy 430 based on the decision forest; an indication one or more hyperparameters characterising the decision forest in the group of: maximum or minimum depth of the decision forest; depth of the decision forest; maximum or minimum number of decision trees; number of decision trees in the decision forest; information gain criterion; at least one indication of the stopping criteria to determine the depth of the decision forest.

Step 602, which only may be comprised in some embodiments, may comprise selecting which at least one feature to utilise for representing the state of at least a part of the communication system 200.

The feature representing the state of at least a part of the communication system 200, may be selected based on any, some or a combination of: a measurement related to received signal quality made by and received from a user device 220 in the radio cell 215, 235-1, 235-2, 235-3; a measurement related to received signal quality made by and received from a user device 220 in another radio cell 215, 235-1, 235-2, 235-3; a measurement related to downlink transmission power of the radio cell 215, 235-1, 235-2, 235-3 made by and obtained from the radio network node 210, 230, 500 controlling the radio cell 215, 235-1, 235-2, 235-3; a measurement related to a number of active user devices 220 in the radio cell 215, 235-1, 235-2, 235-3; a measurement related to types or distribution of traffic within the radio cell 215, 235-1, 235-2, 235-3; a measurement related to location or distribution of user devices 220 in the radio cell 215, 235-1, 235-2, 235-3; or a performance measurement, associated with the performance within the radio cell 215, 235-1, 235-2, 235-3.

Step 603, which only may be comprised in some embodiments, may comprise selecting which performance measurement associated with the radio cell 215, 235-1, 235-2, 235-3 to utilise for representing the performance of the radio cell 215, 235-1, 235-2, 235-3.

Step 604 comprises determining at least one feature representing a state of at least a part of the communication system 200, at a first time period. The part of the communication system 200 may be the part of the communication system 200 wherein the radio cell 215, 235-1, 235-2, 235-3 for which control of the radio resource parameter is to be performed, is situated.

The determination of said feature may in some embodiments comprise iterating the determination of the feature representing the state of at least the part of the communication system 200.

The feature representing the state of at least a part of the communication system 200 wherein the radio cell 215, 235-1, 235-2, 235-3 may be situated, may be determined based on any, some or a combination of: a measurement related to received signal quality made by and received from a user device 220 in the radio cell 215, 235-1, 235-2, 235-3; a measurement related to received signal quality made by and received from a user device 220 in another radio cell 215, 235-1, 235-2, 235-3; a measurement related to downlink transmission power of the radio cell 215, 235-1, 235-2, 235-3 made by and obtained from the radio network node 210, 230, 500 controlling the radio cell 215, 235-1, 235-2, 235-3; a measurement related to a number of active user devices 220 in the radio cell 215, 235-1, 235-2, 235-3; a measurement related to types or distribution of traffic within the radio cell 215, 235-1, 235-2, 235-3; a measurement related to location or distribution of user devices 220 in the radio cell 215, 235-1, 235-2, 235-3; or a performance measurement, associated with the performance within the radio cell 215, 235-1, 235-2, 235-3.

Step 605 comprises determining a control action to be performed for configuring the radio resource parameter in the radio cell 215, 235-1, 235-2, 235-3 at the first time period, out of a set of available control actions associated with the radio cell 215, 235-1, 235-2, 235-3, based on the obtained 601 control policy 430.

The determination of the control action may be iterated according to some embodiments.

Further, the set of available control actions associated with the radio cell 215, 235-1, 235-2, 235-3 may be adjusted according to some embodiments, based on the determined 604 at least one feature representing the state of the part of the communication system 200 wherein the radio cell 215, 235-1, 235-2, 235-3 may be comprised, or based on the control policy 430 received by the trainer node 400.

Step 606 comprises configuring the radio resource parameter of the radio cell 215, 235-1, 235-2, 235-3 based on the determined 605 control action.

The configuration of the radio resource parameter may be iterated according to some embodiments.

Step 607, which only may be comprised in some embodiments wherein the radio network node 230 controlling the radio cell 235-1, 235-2, 235-3 is not co-located with the agent node 210, may comprise transmitting the configured 606 radio resource parameter of the radio cell 235-1, 235-2, 235-3 to the radio network node 230 for control of the radio resource parameter in the radio cell 235-1, 235-2, 235-3 of the radio network node 230.

Step 608, which only may be comprised in some embodiments, may comprise determining the feature representing the state of the part of the communication system 200 wherein the radio cell 215, 235-1, 235-2, 235-3 may be situated, at a second time period.

The feature representing the state of the part of the communication system 200 may typically be the same as previously determined 604 at the first time period, enumerated in step 604.

Step 609, which only may be comprised in some embodiments, may comprise determining a performance measurement, associated with the performance within the radio cell 215, 235-1, 235-2, 235-3, or within the communication system 200 or a subset thereof.

The performance measurement may be made at the first time period in some embodiments and at the second time period in some embodiments.

The determined performance measurement may be iterated in some embodiments.

The performance measurement associated with the radio cell 215, 235-1, 235-2, 235-3 may in some embodiments be determined, given the feature representing the state at the first time period t and the control action $a_t$ taken at the first time period t.

The performance measurement, associated with the performance within the radio cell 215, 235-1, 235-2, 235-3 may in some embodiments be determined by computing a weighted sum of scalars $x_i \in X$, parameterised by a scalar coefficient $\alpha \in [0, \infty)$ and transformed by a function $h_i: X \to R$ (with domain X and range of real scalars), $$r_t(x) = \frac{1}{1-\alpha} \sum_{x_i \in X} w_i (h_i(x_i)^{1-\alpha} - 1) \ \alpha \in [0, \infty),$$

where $x_i$ represents a radio measurement or a performance indicator associated with the radio cell 215, 235-1, 235-2, 235-3, X is the set of all radio measurements or performance indicators associated with the radio cell 215, 235-1, 235-2, 235-3 and used for the definition of the performance measurement, $w_i$ is a weight associated with $x_i$, and $x = [x_1, \ldots x_{|x|}]$ is a vector comprising all $x_i \in X$.

Step 610, which only may be comprised in some embodiments wherein step 609 has been performed, may comprise computing a performance measurement associated with at least a part of the communication system 200 wherein the radio cell 215, 235-1, 235-2, 235-3 may be situated, based on the determined 609 performance measurement and a network performance measurement received from another radio network node 230, 500 in the communication system 200.

Step 611, which only may be comprised in some embodiments, may comprise transmitting a training data message 420 to the trainer node 400, comprising one or more in the group of: the determined 604 feature representing the state at the first time period, the determined 605 control action performed at the first time period, the determined 608 feature representing the state at the second time period, and the determined 609 performance measurement.

In some embodiments wherein step 610 has been performed, the training data message 420 transmitted to the trainer node 400 comprises the computed 610 performance measurement.

In some embodiments wherein the radio network node 500 controlling the radio cell 235-1, 235-2, 235-3 of the control is another agent node 500, the training data message 420 transmitted to the trainer node 400 may comprise a training data message 420 which has previously been received from the other agent node 500.

The transmission of the training data message 420, or of a plurality of training data messages 420 in a collected batch of training data messages 420 to the trainer node 400, may be iterated in some embodiments.

Step 612, which only may be comprised in some embodiments wherein the obtained 601 control policy 430 further may comprise an exploration-to-exploitation control parameter, associated with a probability of applying the control policy 430, may comprise determining application of the obtained 601 control policy 430, based on the obtained 601 exploration-to-exploitation control parameter.

In some embodiments, any, some or all method steps 601-612 may be iterated infinitely, for a limited period of time, or until a threshold limit is achieved.

Figure 6:
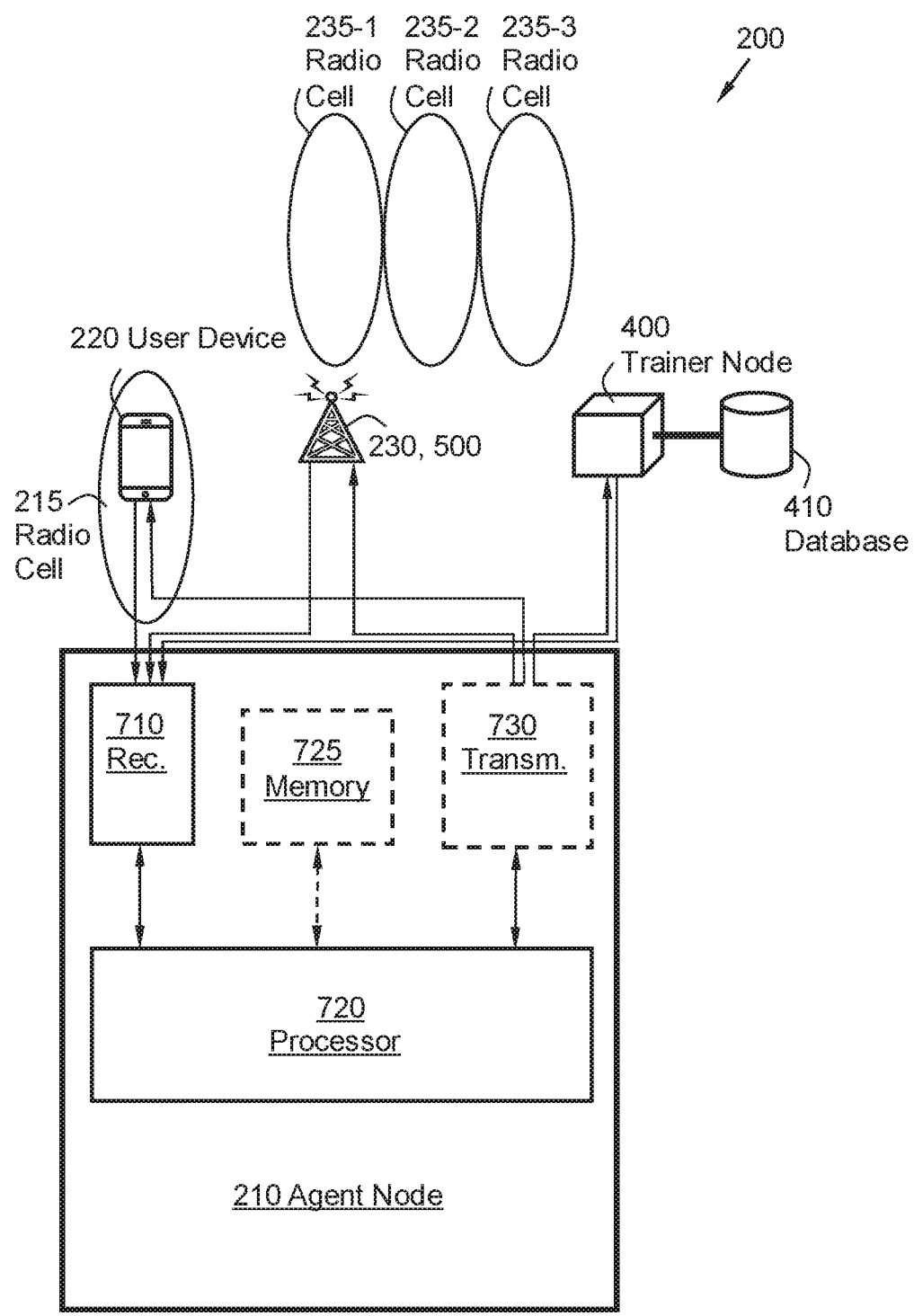
FIG. 6 is a block diagram illustrating an agent node architecture according to an embodiment of the invention.

FIG. 6 illustrates an embodiment of an agent node 210, 500 for configuring a radio resource parameter of a radio cell 215, 235-1, 235-2, 235-3 of a communication system 200. The agent node 210, 500 is configured to perform the method 600 according to any, some, all, or at least one of the enumerated method steps 601-612, according to some embodiments.

The agent node 210 is thus configured to obtain a control policy 430. Further, the agent node 210 is configured to determine at least one feature representing a state of at least a part of the communication system 200, e.g. wherein the radio cell 215, 235-1, 235-2, 235-3 is situated, at a first time period. In addition, the agent node 210 is configured to determine a control action to be performed for configuring a radio resource parameter in the radio cell 215, 235-1, 235-2, 235-3 at the first time period, out of a set of available control actions associated with the radio cell 215, 235-1, 235-2, 235-3, based on the obtained control policy 430 and the determined at least one feature. Furthermore, the agent node 210 is also configured to configure the radio resource parameter of the radio cell 215, 235-1, 235-2, 235-3 based on the determined control action.

Furthermore, in some embodiments, the agent node 210, 500 may be further configured to determine a feature representing the state of the part of the communication system 200, at a second time period. The part of the communication system 200 may be the part wherein the radio cell 215, 235-1, 235-2, 235-3 is situated. The agent node 210, 500 may also be configured to determine a performance measurement, associated with the performance within the radio cell 215, 235-1, 235-2, 235-3. Also, the agent node 210, 500 may be additionally configured to transmit a training data message 420 to a trainer node 400, comprising one or more in the group of: the determined feature representing the state at the first time period, the determined control action performed at the first time period, the determined feature representing the state at the second time period, and/or the determined performance measurement. The agent node 210, 500 may also be configured to obtain the control policy 430 by receiving the control policy 430 from the trainer node 400.

In some optional embodiments, the agent node 210, 500 may be configured to select which at least one feature to utilise for representing the state of at least a part of the communication system 200. Further, the agent node 210, 500 may also be configured to select which performance measurement associated with the radio cell 215, 235-1, 235-2, 235-3 to utilise for representing the performance of the radio cell 215, 235-1, 235-2, 235-3.

According to some embodiments, the agent node 210, 500 may be configured to transmit the configured radio resource parameter instruction of the radio cell 235-1, 235-2, 235-3 to the radio network node 230 for adjusting the radio resource parameter of the radio cell 235-1, 235-2, 235-3 of the radio network node 230, when the radio network node 230 controlling the radio cell 235-1, 235-2, 235-3 is not co-located with the agent node 210.

Furthermore, the agent node 210, 500 may also be configured to determine the feature representing the state of at least a part of the communication system 200, e.g. where the radio cell 215, 235-1, 235-2, 235-3 is situated, based on any of: a measurement related to received signal quality made by and received from a user device 220 in the radio cell 215, 235-1, 235-2, 235-3; a measurement related to received signal quality made by and received from a user device 220 in another radio cell 215, 235-1, 235-2, 235-3; a measurement related to downlink transmission power of the radio cell 215, 235-1, 235-2, 235-3 made by and obtained from the radio network node 210, 230, 500 controlling the radio cell 215, 235-1, 235-2, 235-3; a measurement related to a number of active user devices 220 in the radio cell 215, 235-1, 235-2, 235-3; a measurement related to types, or distribution, of traffic within the radio cell 215, 235-1, 235-2, 235-3; a measurement related to location, or distribution, of user devices 220 in the radio cell 215, 235-1, 235-2, 235-3; or a performance measurement, associated with the performance within the radio cell 215, 235-1, 235-2, 235-3.

The agent node 210, 500 may be configured to compute a performance measurement associated with at least a part of the communication system 200, e.g. wherein the radio cell 215, 235-1, 235-2, 235-3 is comprised, based on the determined performance measurement and at least one other network performance measurement received from another radio network node 230, 500 in the communication system 200. Further, the agent node 210, 500 may also be configured to transmit the training data message 420 to the trainer node 400 comprising the computed performance measurement, in some embodiments.

In addition, the agent node 210, 500 may be configured to obtain an exploration-to-exploitation control parameter, associated with a probability of applying the determined control policy 430. The agent node 210, 500 may further be configured to determine application of the obtained control policy 430, based on the obtained exploration-to-exploitation control parameter. The exploration-to-exploitation control parameter may e.g. be received from the trainer node 400 together with the control policy 430 in some embodiments.

In some embodiments, wherein a radio network node 500 controlling the radio cell 235-1, 235-2, 235-3 is another agent node 500, the agent node 210 may be configured to transmit the training data message 420 to the trainer node 400 comprising a training data message 420 received from the other agent node 500. The agent node 210, 500 may also be further configured to forward the control policy 430 to be utilised for radio resource parameter adjustment in the radio cell 235-1, 235-2, 235-3 of the other agent node 500 in the communication system 200, received from the trainer node 400, to the other agent node 500.

According to some optional embodiments, the agent node 210, 500 may be configured to iterate the determination of the feature representing the state of at least a part of the communication system 200; the determination of the control action; the configuration of the radio resource parameter instruction; the determination of the performance measurement; the transmission of the training data message 420, or a plurality of training data messages 420, to the trainer node 400 and/or the obtaining of the control policy 430.

The agent node 210, 500 may in addition be configured to adjust the set of available control actions associated with the radio cell 215, 235-1, 235-2, 235-3, based on the determined at least one feature representing the state of the part of the communication system 200, or based on the obtained control policy 430.

Also, in some embodiments, the agent node 210, 500 may be configured to obtain the control policy 430, represented by one or more of: an indicator configuring a combining method for the agent node 210, 500 to aggregate results produced by individual neural networks for determining the control action; an indicator of the activation function for neurons in at least one neural network; an indicator of a parameter representing an axis aligned data split function for the control policy 430 when based on a decision forest; an indicator of at least two parameters representing a linear data split function for the control policy 430 based on the decision forest; an indicator of a parameter representing a quadratic data split function for the control policy 430 based on the decision forest; an indication one or more hyperparameters characterising the decision forest in the group of: maximum or minimum depth of the decision forest; depth of the decision forest; maximum or minimum number of decision trees; number of decision trees in the decision forest; information gain criterion; at least one indication of the stopping criteria to determine the depth of the decision forest.

Additionally, the agent node 210, 500 may be configured, in some embodiments, to obtain the control policy 430, comprising an adjustment of the set of available control actions associated with the radio cell 215, 235-1, 235-2, 235-3; an indicator configuring a combining method for the agent node 210, 500 to aggregate results produced by individual neural networks for determining the control action; an indicator of the activation function for neurons in at least one neural network; an indicator of a parameter representing an axis aligned data split function for the control policy 430 when based on a decision forest; an indicator of at least two parameters representing a linear data split function for the control policy 430 based on the decision forest; an indicator of a parameter representing a quadratic data split function for the control policy 430 based on the decision forest; an indication one or more hyperparameters characterising the decision forest in the group of: maximum or minimum depth of the decision forest; depth of the decision forest; maximum or minimum number of decision trees; number of decision trees in the decision forest; information gain criterion; and/or at least one indication of the stopping criteria to determine the depth of the decision forest.

The agent node 210, 500 may in some embodiments be configured to determine the performance measurement associated with the radio cell 215, 235-1, 235-2, 235-3, given the feature representing the state of the communication system 200, or a subset thereof, at the first time period t and the control action $a_t$ taken at first time period t.

In some embodiments, the agent node 210, 500 may be additionally configured to determine the performance measurement, associated with the performance within the radio cell 215, 235-1, 235-2, 235-3 by computing a weighted sum of scalars $x_i \in X$, parameterised by a scalar coefficient $\alpha \in [0, \infty)$ and transformed by a function $h_i: X \to R$ (with domain land range of real scalars), $$r_t(x) = \frac{1}{1-\alpha} \sum_{x_i \in X} w_i (h_i(x_i)^{1-\alpha} - 1) \; \alpha \in [0, \infty),$$

where $x_i$ represents a radio measurement or a performance indicator associated with the radio cell 215, 235-1, 235-2, 235-3, X is the set of all radio measurements or performance indicators associated with the radio cell 215, 235-1, 235-2, 235-3 and used for the definition of the performance measurement, $w_i$ is a weight associated with $x_i$, and $x = [x_1, \ldots x_{|x|}]$ is a vector comprising all $x_i \in X$.

For enhanced clarity, any internal electronics or other components of the agent node 210, not completely indispensable for understanding the herein described embodiments has been omitted from FIG. 6.

The agent node 210 comprises a receiver 710, configured for receiving e.g. signal strength/quality measurements from one or more user devices 220, for receiving e.g. signal strength/quality measurements or other information from one or more radio network nodes 230; or for receiving e.g. the control policy 430 from the trainer node 400.

Further, the agent node 210 comprises a processor 720, configured for configuring a radio resource parameter of the radio cell 215, 235-1, 235-2, 235-3 in the communication system 200, by performing at least some steps 601-612 of the described method 600.

Such processor 720 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

Further, the agent node 210 may in some embodiments comprise a transmitter 730, configured for transmitting various signals, to be received by the user device 220, radio network node 230, other agent node 500 and/or trainer node 400.

In further addition, the agent node 210 may comprise at least one memory 725, according to some embodiments. The optional memory 725 may comprise a physical device utilised to store data or programs, i.e., sequences of instructions, on a temporary or permanent basis. According to some embodiments, the memory 725 may comprise integrated circuits comprising silicon-based transistors. Further, the memory 725 may be volatile or non-volatile.

At least a sub-set of the previously described method steps 601-612 to be performed in the agent node 210 may be implemented through the one or more processing circuits 720 in the agent node 210, together with a computer program product for performing the functions of at least some of the method steps 601-612. Thus a computer program product, comprising instructions for performing the method steps 601-612 may perform radio resource parameter adjustment of the radio cell 215, 235-1, 235-2, 235-3 in the communication system 200, when the computer program is loaded into the processor 720 of the agent node 210.

The computer program mentioned above may be provided for instance in the form of a data carrier carrying computer program code for performing at least some of the method steps 601-612 according to some embodiments when being loaded into the processor 720. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the agent node 210 remotely, e.g., over an Internet or an intranet connection.

Figure 7:
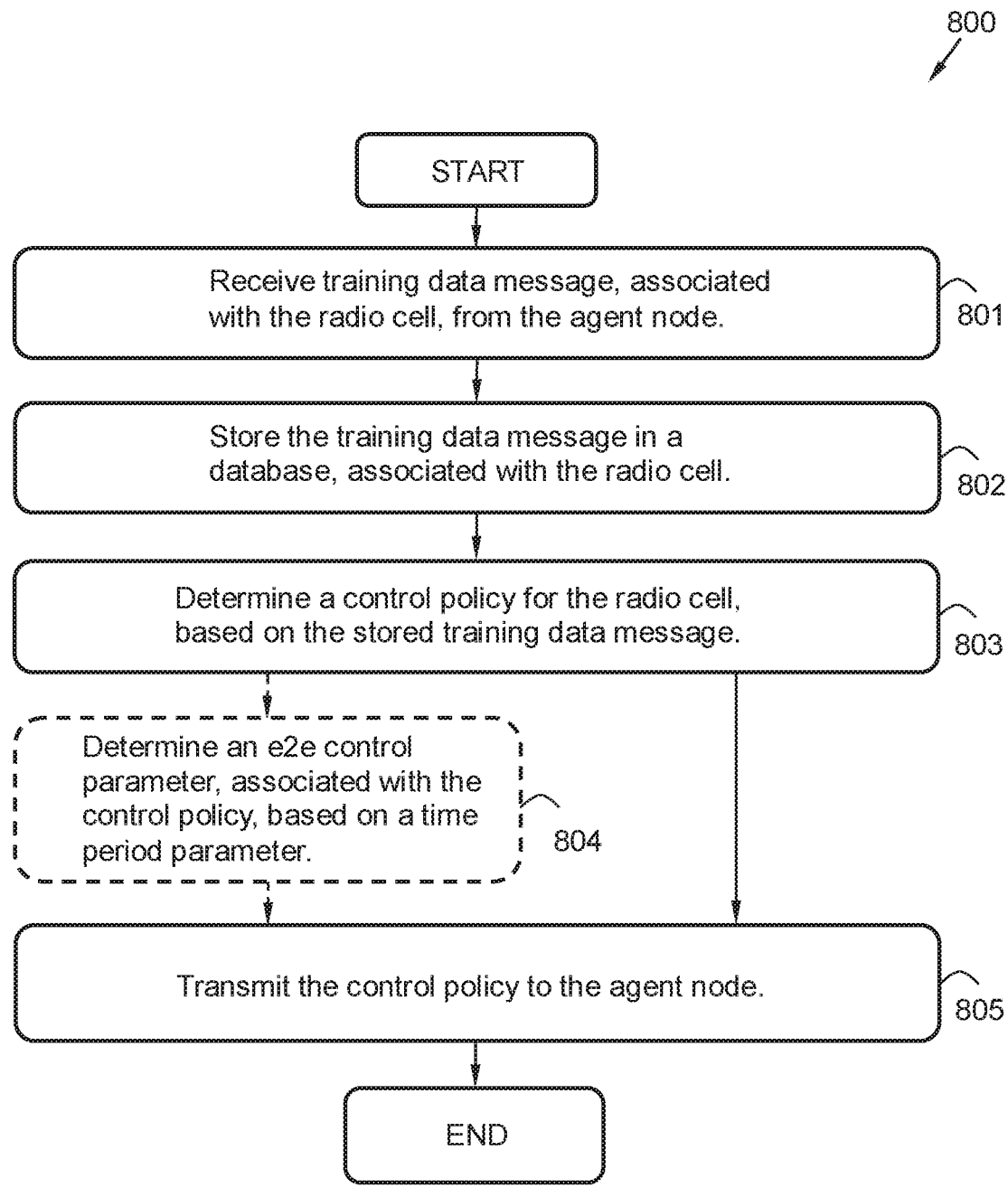
FIG. 7 is a flow chart illustrating a method in a trainer node according to an embodiment of the invention.

FIG. 7 is a flow chart illustrating embodiments of a method 800 in a trainer node 400 for determining a control policy 430 to be utilised by an agent node 210, 500 for configuring a radio resource parameter of a radio cell 215, 235-1, 235-2, 235-3 of a communication system 200.

The radio cell 215, 235-1, 235-2, 235-3 is controlled by the agent node 210 or in some embodiments by another agent node 500, or alternatively by a network node 230, which in turn is controlled by the agent node 210, 500. The agent node 210 may be co-located with a trainer node 400 and/or the network node 230 controlling the radio cell 215, 235-1, 235-2, 235-3 in some embodiments. Alternatively, the agent node 210 may be situated at a distance from the trainer node 400 and/or the network node 230.

The control policy 430 may be represented by one or more of: an indicator configuring a combining method for the agent node 210, 500 to aggregate results produced by individual neural networks for determining the control action; an indicator of the activation function for neurons in at least one neural network; an indicator of a parameter representing an axis aligned data split function for the control policy 430 when based on a decision forest; an indicator of at least two parameters representing a linear data split function for the control policy 430 based on the decision forest; an indicator of a parameter representing a quadratic data split function for the control policy 430 based on the decision forest; an indication one or more hyperparameters characterising the decision forest in the group of: maximum or minimum depth of the decision forest; depth of the decision forest; maximum or minimum number of decision trees; number of decision trees in the decision forest; information gain criterion; at least one indication of the stopping criteria to determine the depth of the decision forest.

According to various embodiments, the obtained control policy 430 may further comprise: an adjustment of the set of available control actions associated with the radio cell 215, 235-1, 235-2, 235-3; an indicator configuring a combining method for the agent node 210, 500 to aggregate results produced by individual neural networks for determining the control action; an indicator of the activation function for neurons in at least one neural network; an indicator of a parameter representing an axis aligned data split function for the control policy 430 when based on a decision forest; an indicator of at least two parameters representing a linear data split function for the control policy 430 based on the decision forest; an indicator of a parameter representing a quadratic data split function for the control policy 430 based on the decision forest; an indication one or more hyperparameters characterising the decision forest in the group of: maximum or minimum depth of the decision forest; depth of the decision forest; maximum or minimum number of decision trees; number of decision trees in the decision forest; information gain criterion; at least one indication of the stopping criteria to determine the depth of the decision forest.

To appropriately determine the control policy 430 to be utilised by the agent node 210, 500 for configuring the radio resource parameter of the radio cell 215, 235-1, 235-2, 235-3 the method 800 may comprise a number of steps 801-805.

It is however to be noted that any, some or all of the described steps 801-805, may be performed in a somewhat different chronological order than the enumeration indicates, be performed simultaneously or even be performed in a completely reversed order according to different embodiments. Some actions such as e.g. step 804 may be performed within some, but not necessarily all embodiments. Further, it is to be noted that some actions may be performed in a plurality of alternative manners according to different embodiments, and that some such alternative manners may be performed only within some, but not necessarily all embodiments.

The trainer node 400 may in some embodiments periodically re-perform any, some or all of step 801-805, thereby providing a continuously updated control policy 430 according to some embodiments. The method 800 may comprise the following steps:

Step 801 comprises receiving a training data message 420, associated with the radio cell 215, 235-1, 235-2, 235-3, from the agent node 210, 500, wherein the training data message 420 comprises one or more in the group of: a feature representing a state of at least a part of the communication system 200 at a first time period, a control action performed by the agent node 210, 500 in the radio cell 215, 235-1, 235-2, 235-3 at the first time period, a feature representing the state at the second time period, and a performance measurement.

The performance measurement may have been made at the first time period in some embodiments and at the second time period in some embodiments.

In some embodiments, a conjunct performance measurement may be computed, associated with at least a part of the communication system 200, based on the performance measurement received in the training data message 420 received from the agent node 210, 500 and another performance measurement received from another radio network node 230, 500 in the communication system 200.

Step 802 comprises storing the received 801 training data message 420 in a database 410, associated with the radio cell 215, 235-1, 235-2, 235-3.

Step 803 comprises determining the control policy 430 for the radio cell 215, 235-1, 235-2, 235-3, based on at least one training data message 420, stored 802 in the database 410.

Step 804, which only may be comprised in some embodiments, may comprise determining an exploration-to-exploitation control parameter, associated with the determined 803 control policy 430.

The exploration-to-exploitation control parameter may be determined to be reduced over time, in some embodiments.

Step 805 comprises transmitting the determined 803 control policy 430 to the agent node 210, 500.

In some embodiments, wherein step 804 has been performed may comprise transmitting the determined 804 exploration-to-exploitation control parameter to the agent node 210, 500 together with the determined 803 control policy 430.

In some alternative embodiments, the method 800 further may comprise selecting which at least one feature the agent node 210, 500 is to utilise for representing the state of at least a part of the communication system 200 wherein the radio cell 215, 235-1, 235-2, 235-3 is comprised and sending the made selection to the agent node 210, 500.

The method 800 may further comprise selecting which performance measurement associated with the radio cell 215, 235-1, 235-2, 235-3 the agent node 210, 500 is to utilise for representing the performance of the radio cell 215, 235-1, 235-2, 235-3 and sending the made selection to the agent node 210, 500, in some embodiments.

In some embodiments, any, some or all method steps 801-805 may be iterated infinitely, for a limited period of time, or until a threshold limit is achieved.

Figure 8:
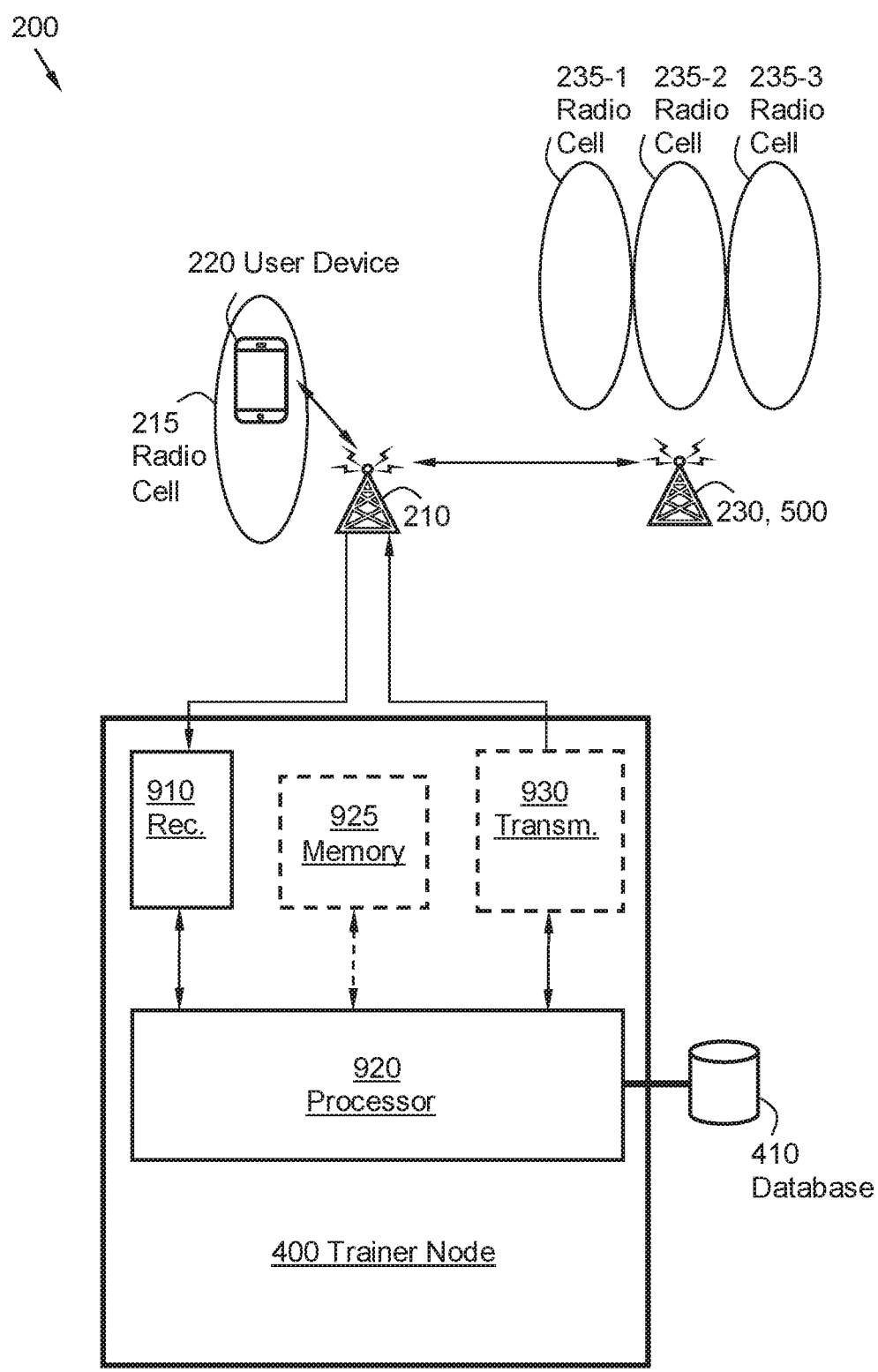
FIG. 8 is a block diagram illustrating a trainer node architecture according to an embodiment of the invention.

FIG. 8 illustrates an embodiment of a trainer node 400 for determining a control policy 430 to be utilised by an agent node 210, 500 for configuring a radio resource parameter of a radio cell 215, 235-1, 235-2, 235-3 of a communication system 200. The trainer node 400 is configured to perform the method 800 according to any, some, all, or at least one of the enumerated method steps 801-805, according to some embodiments.

The trainer node 400 is thus configured to receive a training data message 420, associated with the radio cell 215, 235-1, 235-2, 235-3, from the agent node 210, 500, wherein the training data message 420 comprises one or more in the group of: a feature representing a state of at least a part of the communication system 200 at a first time period, a control action performed by the agent node 210, 500 in the radio cell 215, 235-1, 235-2, 235-3 at the first time period, a feature representing the state at the second time period, and a performance measurement. The trainer node 400 is also configured to store the received training data message 420 in a database 410 associated with the radio cell 215, 235-1, 235-2, 235-3. Further, the trainer node 400 is configured to determine the control policy 430 for the radio cell 215, 235-1, 235-2, 235-3, based on at least one training data message 420, stored in the database 410. In addition, the trainer node 400 is further configured to transmit the determined control policy 430 to the agent node 210, 500.

In some embodiments, the trainer node 400 may be configured to determine an exploration-to-exploitation control parameter, associated with a probability of applying the determined control policy 430, e.g. based on a time period parameter in some alternative embodiments; and wherein the determined exploration-to-exploitation control parameter is transmitted to the agent node 210, 500 together with the determined control policy 430.

In addition, the trainer node 400 may be configured to determine the exploration-to-exploitation control parameter so that the probability of applying the determined control policy 430 is increased over time.

Also, the trainer node 400 may be further configured to compute a performance measurement associated with at least a part of the communication system 200, based on the performance measurement received in the training data message 420 received from the agent node 210, 500 and at least one other performance measurement received from another radio network node 230, 500 in the communication system 200.

Furthermore, the trainer node 400 may be configured to select which at least one feature the agent node 210, 500 is to utilise for representing the state of at least a part of the communication system 200 and provide the made selection to the agent node 210, 500.

The trainer node 400 may in addition be configured to select which performance measurement associated with the radio cell 215, 235-1, 235-2, 235-3, the agent node 210, 500 is to utilise for representing the performance of the radio cell 215, 235-1, 235-2, 235-3 and provide the made selection to the agent node 210, 500.

For enhanced clarity, any internal electronics or other components of the trainer node 400, not completely indispensable for understanding the herein described embodiments has been omitted from FIG. 8.

The trainer node 400 comprises a receiver 910, configured for receiving e.g. signal strength/quality measurements in a Training Data Message 420 from one or more agent nodes 210, 500.

Further, the trainer node 400 comprises a processor 920, configured for determining the control policy 430 to be utilised by the agent node 210, 500 for downlink power control of the radio cell 215, 235-1, 235-2, 235-3 of a communication system 200, by performing at least some steps 801-805 of the described method 800.

Such processor 920 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

Further, the trainer node 400 may in some embodiments comprise a transmitter 930, configured for transmitting various signals and instructions, e.g. comprising the determined control policy 430, to be received by the agent node 210, 500; or possibly another training node.

In further addition, the trainer node 400 may comprise at least one memory 925, according to some embodiments. The optional memory 925 may comprise a physical device utilised to store data or programs, i.e., sequences of instructions, on a temporary or permanent basis. According to some embodiments, the memory 925 may comprise integrated circuits comprising silicon-based transistors. Further, the memory 925 may be volatile or non-volatile.

At least a sub-set of the previously described method steps 801-805 to be performed in the trainer node 400 may be implemented through the one or more processing circuits 920 in the trainer node 400, together with a computer program product for performing the functions of at least some of the method steps 801-805. Thus a computer program product, comprising instructions for performing the method steps 801-805 may determine the control policy 430 to be utilised by the agent node 210, 500 for configuring a radio resource parameter of the radio cell 215, 235-1, 235-2, 235-3 in the communication system 200.

The computer program mentioned above may be provided for instance in the form of a data carrier carrying computer program code for performing at least some of the method steps 801-805 according to some embodiments when being loaded into the processor 920. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the trainer node 400 remotely, e.g., over an Internet or an intranet connection.

The terminology used in the description of the embodiments as illustrated in the accompanying drawings is not intended to be limiting of the described agent node 210, method 600 therein, trainer node 400, or method 800 therein. Various changes, substitutions and/or alterations may be made, without departing from the invention as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including"

and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

Finally, it should be understood that the present invention is not limited to the embodiments described above, but also relates to and incorporates all embodiments within the scope of the appended independent claims.

What is claimed is:

1. A system comprising an agent node and a trainer node, wherein the agent node is configured to configure a radio resource parameter of a radio cell of a communication system wherein the trainer node is configured to:
    receive a training data message, associated with the radio cell, from the agent node, wherein the training data message comprises at least one of:
        a set of features representing a state of at least a part of the communication system at a first time period,
        a control action performed by the agent node in the radio cell at the first time period,
        the set of features at the second time period, or
        a performance measurement;
    store the received training data message in a database associated with the radio cell;
    determine a control policy for the radio cell based on a Reinforcement Learning algorithm, and
    transmit the determined control policy to the agent node; and, wherein the agent node is further configured to:
        obtain the control policy by receiving it from the trainer node;
        determine the set of feature representing the state of at least a part of the communication system, at the first time period;
        determine the control action to be performed for configuring the radio resource parameter in the radio cell at the first time period, out of a set of available control actions associated with the radio cell, based on the obtained control policy and the set of feature representing the state of the part of the communication system, at the first time period; and
        configure the radio resource parameter of the radio cell based on the determined control action.

2. The system according to claim 1, wherein the agent node is further configured to:
    determine the feature representing the state of the part of the communication system, at a second time period;
    determine a performance measurement, associated with the performance within the radio cell; and
    transmit a training data message to a trainer node comprising at least one of:
        the determined feature representing the state at the first time period,
        the determined control action performed at the first time period,
        the determined feature representing the state at the second time period, and
        the determined performance measurement.

3. The system according to claim 1, wherein a radio network node controlling the radio cell is not co-located with the agent node; and, wherein the agent node is further configured to:
    transmit an instruction to the radio network node for configuring the radio resource parameter of the radio cell.

4. The system according to claim 1, wherein the feature representing the state of at least a part of the communication system, is determined based on any one of:
    a measurement related to received signal quality made by and received from a user device in the radio cell;
    a measurement related to received signal quality made by and received from a user device in another radio cell;
    a measurement related to downlink transmission power of the radio cell made by and obtained from the radio network node controlling the radio cell;
    a measurement related to a number of active user devices in the radio cell;
    a measurement related to types or distribution of traffic within the radio cell;
    a measurement related to location or distribution of user devices in the radio cell; or
    a performance measurement, associated with the performance within the radio cell;
    a measurement related to resource utilisation in the radio cell;
    a measurement related to electrical tilt associated with the radio cell.

5. The system according to claim 2, wherein the agent node is further configured to:
    compute a performance measurement associated with at least a part of the communication system, based on the determined performance measurement and at least one other network performance measurement received from another radio network node in the communication system;
    and, wherein the training data message transmitted to the trainer node comprises the computed performance measurement.

6. The system according to claim 1, wherein the obtained control policy further comprises an exploration-to-exploitation control parameter, associated with a probability of applying the determined control policy wherein the determined exploration-to-exploitation control parameter is transmitted to the agent node together with the determined control policy; and wherein the agent node is further configured to:
    determine application of the obtained control policy, based on the obtained exploration-to-exploitation control parameter.

7. The system according to claim 2, wherein the radio network node controlling the radio cell for which the radio resource parameter is configured is another agent node and the training data message transmitted to the trainer node comprises a training data message received from the another agent node; and wherein the agent node is further configured to forward the control policy to be utilised for configuring the radio resource parameter in the radio cell of the other agent node in the communication system received from the trainer node, to the other agent node.

8. The system according to claim 2, wherein the agent node is further configured to iterate the determination of the feature representing the state of at least a part of the communication system the determination of the control action; the configuration of the radio resource parameter instruction; the determination of the performance measurement; the transmission of the training data message or a plurality of training data messages, to the trainer node and the obtaining of the control policy.

9. A method for configuring a radio resource parameter of a radio cell of a communication system which method comprises:
  receiving, by a trainer node, a training data message, associated with the radio cell, from an agent node, wherein the training data message comprises at least one of:
    a set of features representing a state of at least a part of the communication system at a first time period,
    a control action performed by the agent node in the radio cell at the first time period,
    the set of features representing the state at the second time period, or
    a performance measurement;
  storing, by the trainer node, the received training data message in a database, associated with the radio cell;
  determining, by the trainer node, the control policy for the radio cell based on a Reinforcement Learning algorithm, and
  transmitting, by the trainer node, the determined control policy to the agent node; and, wherein the method further comprises:
    obtaining, by the agent node, the control policy from the trainer node;
    determining, by the agent node, the set of feature representing a state of at least a part of the communication system, at the first time period;
    determining, by the agent node, the control action to be performed for configuring the radio resource parameter in the radio cell at the first time period, out of a set of available control actions associated with the radio cell, based on the obtained control policy; and
    configuring by the agent node, the radio resource parameter of the radio cell based on the determined control action.

10. The method according to claim 9, wherein the method further comprises:
  determining the feature representing the state of the part of the communication system, at a second time period;
  determining a performance measurement, associated with the performance within the radio cell; and
  transmitting a training data message to a trainer node, comprising one or more in the group of:
    the determined feature representing the state at the first time period,
    the determined control action performed at the first time period,
    the determined feature representing the state at the second time period, and
    the determined performance measurement;
  and wherein the obtained control policy is received from the trainer node.

11. The method according to claim 9, wherein a radio network node controlling the radio cell is not co-located with the agent node; and wherein the method further comprises:
  transmitting an instruction to the radio network node for configuring the radio resource parameter of the radio cell.

12. The method according to claim 9, wherein the feature representing the state of at least a part of the communication system, is determined based on any one of:
  a measurement related to received signal quality made by and received from a user device in the radio cell;
  a measurement related to received signal quality made by and received from a user device in another radio cell;
  a measurement related to downlink transmission power of the radio cell made by and obtained from the radio network node controlling the radio cell;
  a measurement related to a number of active user devices in the radio cell;
  a measurement related to types or distribution of traffic within the radio cell;
  a measurement related to location or distribution of user devices in the radio cell; or
  a performance measurement, associated with the performance within the radio cell;
  a measurement related to resource utilisation in the radio cell;
  a measurement related to electrical tilt associated with the radio cell.

13. The method according to claim 10, wherein the method further comprises:
  computing a performance measurement associated with at least a part of the communication system, based on the determined performance measurement and at least one other network performance measurement received from another radio network node in the communication system; and, wherein
  the training data message transmitted to the trainer node comprises the computed performance measurement.

14. The method according to claim 9, wherein the obtained control policy further comprises an exploration-to-exploitation control parameter, associated with a probability of applying the determined control policy, wherein the determined exploration-to-exploitation control parameter is transmitted to the agent node together with the determined control policy; and wherein the method further comprises:
  determining application of the obtained control policy, based on the obtained exploration-to-exploitation control parameter.

15. The method according to claim 10, wherein the radio network node controlling the radio cell for which the radio resource parameter is configured is another agent node and the training data message transmitted to the trainer node comprises a training data message received from the another agent node; and wherein the method further comprises:
  forwarding the control policy to be utilised for configuring the radio resource parameter in the radio cell of the other agent node in the communication system, received from the trainer node, to the other agent node.

16. The method according to claim 10, wherein the method further comprises:
  iterating the determination of the feature representing the state of at least a part of the communication system; the determination of the control action; the configuration of the radio resource parameter instruction; the determination of the performance measurement; the transmission of the training data message, or a plurality of training data messages, to the trainer node and the obtaining of the control policy.

* * * * *